United States Patent
Oveby

(10) Patent No.: US 11,040,520 B2
(45) Date of Patent: Jun. 22, 2021

(54) LAMINATED PACKAGING MATERIAL, PACKAGING CONTAINERS MANUFACTURED THEREFROM AND A METHOD FOR MANUFACTURING THE LAMINATE MATERIAL

(71) Applicant: TETRA LAVAL HOLDINGS & FINANCE S.A., Pully (CH)

(72) Inventor: Claes Oveby, Lomma (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 16/616,537

(22) PCT Filed: May 31, 2018

(86) PCT No.: PCT/EP2018/064368
§ 371 (c)(1),
(2) Date: Nov. 25, 2019

(87) PCT Pub. No.: WO2018/220134
PCT Pub. Date: Dec. 6, 2018

(65) Prior Publication Data
US 2020/0407104 A1     Dec. 31, 2020

(30) Foreign Application Priority Data
May 31, 2017   (EP) ..................... 17173852

(51) Int. Cl.
*B32B 27/10*     (2006.01)
*B32B 1/02*      (2006.01)
(Continued)

(52) U.S. Cl.
CPC ................ *B32B 27/10* (2013.01); *B32B 1/02* (2013.01); *B32B 7/12* (2013.01); *B32B 15/085* (2013.01);
(Continued)

(58) Field of Classification Search
CPC .......... B65D 75/48; B65D 5/563; B65D 5/40; B32B 1/02; B32B 7/12; B32B 15/085;
(Continued)

(56) References Cited

U.S. PATENT DOCUMENTS

| 4,632,959 A    | 12/1986 | Nagano      |
|----------------|---------|-------------|
| 5,248,534 A    | 9/1993  | Rosen       |
| 2017/0120556 A1| 5/2017  | Nyman et al.|

FOREIGN PATENT DOCUMENTS

| EP | 0 865 908 A2 | 9/1998  |
|----|--------------|---------|
| EP | 1059162 A2   | 12/2000 |

(Continued)

OTHER PUBLICATIONS

International Search Report (PCT/ISA/210) dated Aug. 29, 2018, by the European Patent Office as the International Searching Authority for International Application No. PCT/EP2018/064368.
(Continued)

*Primary Examiner* — Walter Aughenbaugh
(74) *Attorney, Agent, or Firm* — Buchanan Ingersoll & Rooney PC

(57) ABSTRACT

The present invention relates to a laminated liquid food packaging material, comprising a bulk layer, and a barrier layer portion and a polymer layer structure for balancing package integrity vs openability of the package. The invention further relates to the method for manufacturing the laminated packaging material and to a packaging container for liquid food packaging, comprising the laminated packaging material.

19 Claims, 9 Drawing Sheets

Figure 1:
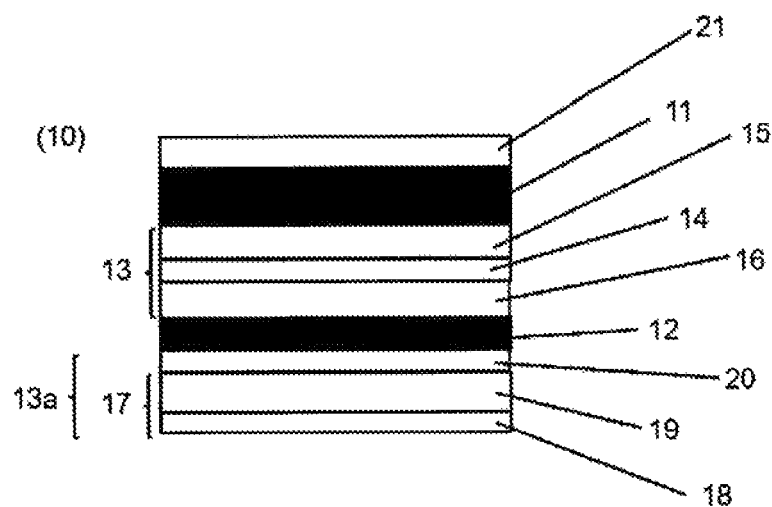

(51) Int. Cl.
  *B65D 5/40* (2006.01)
  *B32B 7/12* (2006.01)
  *B32B 15/085* (2006.01)
  *B32B 15/12* (2006.01)
  *B32B 15/20* (2006.01)
  *B32B 37/15* (2006.01)
  *B65D 5/56* (2006.01)
  *B65D 75/48* (2006.01)

(52) U.S. Cl.
  CPC .............. *B32B 15/12* (2013.01); *B32B 15/20* (2013.01); *B32B 37/153* (2013.01); *B65D 5/40* (2013.01); *B65D 5/563* (2013.01); *B65D 75/48* (2013.01); *B32B 2250/05* (2013.01); *B32B 2307/31* (2013.01); *B32B 2307/7244* (2013.01); *B32B 2323/046* (2013.01); *B32B 2439/62* (2013.01); *B32B 2439/70* (2013.01)

(58) Field of Classification Search
  CPC ......... B32B 15/12; B32B 15/20; B32B 27/10; B32B 37/153; B32B 2307/31; B32B 2307/7244; B32B 2323/046; B32B 2439/62; B32B 2439/70; B32B 2250/05
  See application file for complete search history.

(56) References Cited

FOREIGN PATENT DOCUMENTS

| | | |
|---|---|---|
| EP | 1164085 A1 | 12/2001 |
| EP | 1507660 B1 | 3/2008 |
| RU | 2 053 944 C1 | 2/1996 |
| RU | 2 230 694 C2 | 6/2004 |
| WO | 9826994 A1 | 6/1998 |
| WO | 00/30846 A1 | 6/2000 |
| WO | 2004076580 A1 | 9/2004 |

OTHER PUBLICATIONS

Written Opinion (PCT/ISA/237) dated Aug. 29, 2018, by the European Patent Office as the International Searching Authority for International Application No. PCT/EP2018/064368.

LAMINATED PACKAGING MATERIAL, PACKAGING CONTAINERS MANUFACTURED THEREFROM AND A METHOD FOR MANUFACTURING THE LAMINATE MATERIAL

TECHNICAL FIELD

The present invention relates to a liquid packaging laminated packaging material having a barrier layer or a barrier coating which is sensitive to cracking at strain, and to a method for manufacturing the laminated packaging material.

Furthermore, the invention relates to packaging containers comprising the laminated packaging material or being made of the laminated packaging material.

BACKGROUND

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable thermoplastic polymers, such as adhesive polymers and/or polyolefins. Also on the outside of the bulk layer, there is an outermost heat sealable polymer layer.

The packaging containers are generally produced by means of modern, high-speed packaging machines of the type that form, fill and seal packages from a web or from prefabricated blanks of packaging material. Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic or cuboid, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean conditions such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

Typically many thousands of packages may be prepared per hour. For example the Tetra Pak® A3/speed may manufacture about 15 000 packages per hour (family-size packaging containers of 0.9 liters and above), and about 24 000 packaging containers per hour (portion packages).

Packaging containers for sensitive liquid food, for example milk or juice, can also be produced from sheet-like blanks or prefabricated blanks of the laminated packaging material of the invention. From a tubular blank of the packaging laminate that is folded flat, packages are produced by first of all building the blank up to form an open tubular container capsule, of which one open end is closed off by means of folding and heat-sealing of integral end panels. The thus closed container capsule is filled with the food product in question, e.g. juice, through its open end, which is thereafter closed off by means of further folding and heat-sealing of corresponding integral end panels. An example of a packaging container produced from sheet-like and tubular blanks is the conventional so-called gable-top package. There are also packages of this type which have a moulded top and/or screw cap made of plastic.

The known packaging laminate is conventionally produced from a web of paper or paperboard which is unwound from a storage reel, while at the same time a web of aluminium is unwound from a corresponding storage reel. The two unwound webs are brought together with each other and are both guided through the nip between two adjacent rotatable cylinders, while at the same time a laminating material, usually low-density polyethylene (LDPE), is extruded into a molten polymer film or polymer curtain, which is thus applied between the webs to permanently bind the aluminium web to the paper or paperboard web. The paper or paperboard web is thereafter provided on both sides with liquid-tight coatings of polyethylene, normally low-density polyethylene (LDPE), and is then wound up on finished packaging reels for onward transport and handling.

In order to improve heat sealing properties and quality of liquid food packages, developments to employ metallocene-catalysed linear low density polyethylenes (mLLDPE) in the innermost heat sealing layers were made. The mLLDPE polymers were difficult to melt process in extrusion and moulding operations, why developments in the manufacturing of packaging laminates were made to blend them with other polymers, normally LDPE polymers.

WO98/26994 describes a similar packaging material structure, in which the innermost heat sealable layer is a blend of mLLDPE and from 10 to 50 wt % of LDPE. The layer which laminates the paperboard to the aluminium barrier foil may be LDPE, mLLDPE or a blend thereof. If a blend is employed in the laminating layer, a smaller quantity from 10 to 20 g/m$^2$ is recommended in WO98/26994. This development failed, however, and was never continued. It proved more difficult to find the appropriate blends, than expected at the time.

EP1164085B1 was a later filed and granted patent which describes a similar laminated packaging material, having an innermost heat sealable layer comprising a metallocene-catalysed linear low density polyethylene (mLLDPE), preferable being a blend of mLLDPE and a low density polyethylene (LDPE), which blend material has a density from 0.900 to 0.915 kg/dm$^3$, a peak melting temperature of from 88 to 103° C., a melt flow index of from 5 to 20 g/10 min, and a swelling ratio from 1.4 to 1.6, the thickness of the innermost layer being from 20 to 50 µm. The same polymer blend may be used in the outermost layer on the outside of the paperboard, as well as in the laminate layer which is laminating together the paperboard and a barrier layer of aluminium foil.

In practice, in commercial packaging laminates, of these types, the blended mLLDPE component was only used for the innermost heat sealable layer, however, while for the laminating layer, i.e. the layer between the paperboard and the aluminium foil, and for the outside layers, LDPE's were continued to be used. It was understood that the mLLDPE-containing polymers are stronger and tougher, why they impart too high toughness to a packaging laminate, such that the laminated material becomes difficult to tear open along a perforation line or with an opening device, or difficult to penetrate with a straw through a straw hole, when comprising several such blend layers.

In EP1507660B1, is disclosed an inside heat sealable polymer layer configuration, which is adapted to improve openability properties of the above type packaging laminates, while maintaining good heat sealing properties and melt processing properties. Such a laminate, is also used in practice, i.e. in commercial materials, but while some properties were improved, it adds higher complexity in manufacturing and is connected to a higher manufacturing cost. In such laminated materials, the inside layers are, as counted from the aluminium barrier foil, a thin layer of an adhesive polymer, an LDPE layer and an innermost layer of a blend of an mLLDPE, and preferably from 30 wt % to 40 wt %, of an LDPE. For the laminating layer and the outside layer LDPE polymers are still used.

Decreasing the costs of these packaging materials further, could be made by down-gauging the thickness of the various layers of the laminate.

This may, however, lead to an increased risk that mechanical strength and packaging integrity of the filled and sealed packaging containers, as well as the material barrier properties, are impaired. Instead, it has been normal to increase the thicknesses of the various layers, safeguarding to reach high quality under difficult circumstances. This is somewhat more expensive counted as raw material costs, but more importantly, it counteracts environmental sustainability in that the polymer materials of today's packaging laminates still originate to a large extent from fossil raw material sources. It is undesirable to increase the amount of polymers in the laminates more than necessary.

Moreover, increasing the amounts and thicknesses of the polymer layers, may also cause different package performance issues and influence the shelf-life, i.e. the storage life-time of the packed food product, negatively.

Another aspect regarding technical performance needs to be considered, also for cost and efficiency reasons, i.e. the processability of the materials in the lamination process. This concerns how melt processable the materials are in the various extrusion and lamination operations, and how many stops or changes may be needed in the manufacturing process due to changes of polymers and extruder arrangements between different package specifications. The lamination process normally is carried out at 300 m/min or above, such as at 400 m/min or above, such as at 500 m/min or above, such as at 600 m/min, or above.

SUMMARY

It is therefore, an object to improve the current state of the art, to solve at least some of the above problems, and to provide an improved packaging material.

In particular, it is an object to realise an improved paperboard-based packaging laminate of the described type for packaging of liquid- or semi-liquid food products, which enables manufacturing of filled packages having improved package integrity and barrier properties towards gas, such as oxygen, at maintained openability properties Another object is to provide an improved paperboard-based packaging laminate, which enables manufacturing of filled packages having improved openability at maintained package integrity and barrier properties towards gas, such as oxygen.

A further object is to provide an improved paperboard-based packaging laminate, which enables manufacturing of filled packages having improved package integrity and barrier properties towards gas, such as oxygen, as well as improved openability properties.

Another, further object is to provide the laminated packaging material at high production efficiency, i.e. that it is possible to manufacture at high lamination speed.

It is a still further object to be able to provide filled and sealed high quality packaging containers from the laminated packaging material at a maintained high filling-packaging speed.

Some or all of these objects are attainable according to the present invention by the laminated packaging material, the method of manufacturing the laminated packaging material as well as the packaging container made therefrom, as defined in the appended claims.

According to a first aspect of the present invention, there is provided a liquid carton packaging laminate having the following laminated layer portions, a. an outermost liquid-tight and heat sealable layer of a thermoplastic polymer, outermost meaning directed to the outside of a packaging container made from the packaging laminate, b. a bulk layer of carton or paperboard, the outermost liquid-tight and heat sealable layer being applied on the outer side of the bulk layer, c. a barrier layer portion, d. a lamination layer portion, which binds the opposite, inner side of the bulk layer to the barrier layer portion, e. an innermost layer portion of liquid-tight and heat sealable polymer, applied on the inner, opposite side of the barrier layer portion f. optionally, a layer of an adhesive polymer, which binds the innermost layer portion to the barrier layer portion, and has a thickness from 4 to 9 µm, the innermost layer portion having an intermediate layer of low density polyethylene (LDPE) and an innermost layer, which constitutes the inside surface of a packaging container made from the packaging laminate, of a linear low density polyethylene produced with a metallocene or metallocene-type catalyst, (mLLDPE), the innermost layer portion and the adhesive polymer layer constituting inside polymer layers of the packaging laminate, the lamination layer portion having a center layer of an mLLDPE, and a support layer of LDPE on each side of the center layer, the support layers of LDPE binding the center layer to the bulk layer and to the barrier layer portion, on the respective sides of the center layer, the thickness of the center layer being from 4 to 15 µm and constituting not more than 40% of the total thickness of the lamination layer portion, the total thickness of the lamination layer portion being lower than 50 µm, and the thickness of the innermost layer of mLLDPE being from 6 to 20 µm and constituting not more than 50% of the total thickness of the inside polymer layers, the total thickness of the inside polymer layers being up to 50 μm, and the mLLDPE of the innermost layer having at least one melting point from 95 to 105° C. and the LDPE of the intermediate layer having a melting point from 105 to 115° C.

By such a layer arrangement, within the defined thickness and temperature ranges, a higher degree of freedom in improving the properties of the packaging laminate is provided. Depending on the package specification (type, size, intended use, opening type etc), a combination of thicknesses of layers within these ranges can be found that manages to improve and optimise at least one of the package integrity/shelf-life and openability properties and maintain the other, in an as cost efficient manner as possible, regarding raw material costs. Further, such a layer arrangement enables simplified polymer layer handling in the lamination operations of the manufacturing line of the laminated material, without having to swap polymer grades and change the layer configurations between different package specifications.

According to a second aspect, a method for manufacturing of the packaging material of the first aspect is provided.

The method comprises a step of laminating the bulk layer to the barrier layer portion, while co-extruding the center layer of mLLDPE and at least one of the support layers of LDPE of the lamination layer portion therebetween, and a separate step of coating the inner layer portion on the inside of the barrier layer portion, by co-extruding the innermost layer of mLLDPE together with the intermediate layer of LDPE, and optionally the layer of an adhesive polymer, onto the inside of the barrier layer portion. By coextruding the layers of the laminate layer portion, and the inside polymer layers, respectively, together, the relatively thin separate layers can support each other and preserve sufficient heat together in order to ensure sufficient processability.

Alternatively, the inner layer portion and the adhesive polymer layer may be coated onto the barrier layer portion, such as the aluminium foil, in a first step, in order to form a pre-made inside portion. The thus coated barrier layer portion is subsequently laminated to the bulk layer, by melt extruding a lamination layer portion in a further step.

According to a third aspect, a packaging container having improved properties accordingly, is provided from the packaging material of the first aspect.

DETAILED DESCRIPTION

With the term "long-term storage" in connection with the present invention, is meant that the packaging container should be able to preserve the qualities of the packed food product, i.e. nutritional value, hygienic safety and taste, at ambient conditions for at least 1 or 2 months, such as at least 3 months, preferably longer, such as 6 months, such as 12 months, or more.

With the term "package integrity", is generally meant the package tightness, i.e. the resistance to leakage or breakage of a packaging container. It encompasses the resistance of the package to intrusion of microbes, such as bacteria, dirt, and other substances, that may deteriorate the filled food product and shorten the expected shelf-life of the package.

One main contribution to the integrity of a package from a laminated packaging material is provided by good internal adhesion between adjacent layers of the laminated material. Another contribution comes from the material resistance to defects, such as pinholes, ruptures and the like within each material layer itself, and yet another contribution comes from the strength of the sealing joints, by which the material is sealed together at the formation of a packaging container. Regarding the laminated packaging material itself, the integrity property is thus mainly focused on the adhesion of the respective laminate layers to its adjacent layers, as well as the quality of the individual material layers. Regarding the sealing of the packages, the integrity is mainly focussed on the quality of the sealing joints, which is ensured by well-functioning and robust sealing operations in the filling machines, which in turn is ensured by adequately adapted heat-sealing properties of the laminated packaging material.

The term "liquid or semi-liquid food" generally refers to food products having a flowing content that optionally may contain pieces of food. Dairy and milk, soy, rice, grains and seed drinks, juice, nectar, still drinks, energy drinks, sport drinks, coffee or tea drinks, coconut water, wine, soups, jalapenos, tomatoes, sauce (such as pasta sauce), beans and olive oil are some non-limiting example of food products contemplated.

The term "aseptic" in connection with a packaging material and packaging container refers to conditions where microorganisms are eliminated, in-activated or killed. Examples of microorganisms are bacteria and spores. Generally an aseptic process is used when a product is aseptically packed in a packaging container. For the continued asepticity during the shelf-life of the package, the package integrity properties are of course very important. For long-term shelf-life of a filled food product, it may furthermore be important that the package has barrier properties towards gases and vapours, such as towards oxygen gas, in order to keep its original taste and nutritional value, such as for example its vitamin C content.

With the term "bulk layer" is normally meant the thickest layer or the layer containing the most material in a multi-layer laminate, i.e. the layer which is contributing most to the mechanical properties and the dimensional stability of the laminate and of packaging containers folded from the laminate, such as paperboard or carton. It may also mean a layer providing a greater thickness distance in a sandwich structure, which further interacts with stabilising facing layers, which have a higher Young's modulus, on each side of the bulk layer, in order to achieve sufficient mechanical properties and dimensional stability.

The term "heat-sealing" refers to the process of welding one surface of a thermoplastic material to another thermoplastic surface. A heat-sealable material should, under the appropriate conditions such as applying sufficient heating and pressure, be able to generate a seal when pressed against and in contact with another suitable thermoplastic material. Suitable heating can be achieved by induction heating or ultrasonic heating or other conventional contact or convection heating means, e.g. hot air or impulse heating. Upon heating, the mobility of the polymer chains increase at the material surfaces intended for sealing to each other, such that the chains disentangle and move and re-entangle with polymer chains from the opposite sealing surface. Upon cooling there are created strong bonds of entangled polymer chains across the sealing interface, thus bonding the two material surfaces to each other. The heat sealing operation has to occur within parts of a second and the duration of the different phases, such as heating, partly melting, bonding and cooling, is counted in milliseconds, in packaging machines that produce thousands of packages per hour.

The barrier materials employed in laminated packaging materials that benefit from the present invention are those that are sensitive to cracking when stretched or strained or flexed, such as at creasing, folding and shaping the laminated materials into pouches or cuboid packaging containers from the laminated material. An example of such barrier materials are metal foils, such as the conventionally used aluminium foil. However, also very thin coatings of barrier materials onto a thicker substrate, of a polymer film or a thin paper sheet substrate, may suffer from a similar vulnerability, due to their minute thickness, which may be counted in a couple of micrometers only, or less, or as in the case of vapour deposition coatings or vacuum coatings, in nanometers. Examples are metallised coatings applied by physical vapour deposition, or inorganic coatings such as coatings of silicon oxides or aluminium oxides, or coatings from so called amorphous diamond-like carbon (DLC) coatings.

Thicknesses of polymer layers are given as µm, herein. It should be understood that amounts of polymers in layers may also be given as grams per square meter (g/m$^2$). By recalculating with the density for the specific polymer, it is possible to compare such amounts and thicknesses. The thicknesses of the polymer layers may vary by ±2 µm, such as ±1 µm, due to normal fluctuations in lamination, production and measurements.

Thus, by the laminate layer structure described above and in the appended claims, it is possible to improve the existing material structures and packages made therefrom, further. Relative to the state of the art material structures, for any given package size or type, it will be possible to further improve the package integrity by this new material structure, and still provide openability of the package, or vice versa. Moreover, it will be possible to optimise these properties without adding total production cost to the state of the art material structures, which will also become apparent from the following description.

Since the industry of liquid carton packaging started to explore the strengths and weaknesses of mLLDPE polymers, the know-how and understanding of the lamination and production processes has increased. The lamination equipment of today is more advanced. In the past it was necessary to blend the mLLDPE with LDPE in order to melt extrude it into a stable and reliable molten film, to be applied onto a fast moving web surface. The lamination speeds are considerable higher and more demanding today than 20 years ago, as are also the filling and sealing operations in the filling machines.

Still, there has now been found a way to apply layers that consist of, or essentially consist of, mLLDPE.

With a so-called three-layer inside structure, i.e. the sequence from the Al-foil and inwards being adhesive polymer, intermediate layer of LDPE, and innermost layer comprising mLLDPE in a blend with LDPE, it has become clear that the innermost layer comprising mLLDPE should not be too thick, since it then might impair the openability of the package. When found insufficient for sealing and package integrity, it was nevertheless attempted to increase the amount of mLLDPE in the layer, up to this layer consisting no LDPE at all. In doing so, it was discovered that such pure, or substantially pure, mLLDPE layers of maintained thickness did impair openability of the package, but that when the thickness of the pure mLLDPE layer then in a next step was decreased, the package integrity could be maintained at an improved level, while the openability was improved too. Thus, it was surprisingly discovered that by using less mLLDPE on the inside, but a pure mLLDPE layer, the seemingly unattainable balance between improved openability and improved package integrity could be reached, and the mechanical strength of the layers altogether could be maintained.

A further advantage from using only mLLDPE in the innermost layer, is that mLLDPEs provide a wider "sealing window" in the package sealing process, i.e. a greater robustness of sealing quality, regardless of the control of sealing temperature in the sealing operation.

Since mLLDPE initiates sealing earlier, by initiating melting earlier, it requires less heat energy to be applied, and thus enables a higher sealing speed.

The inside layer configuration may consist of the said three layers, i.e. an adhesive polymer layer, an intermediate LDPE layer and an innermost heat sealable layer of mLLDPE.

Also the other layers of the laminated packaging material influence the package integrity and the openability, and while an increased amount of LDPE does not influence openability to the same extent as mLLDPE, it was understood that a too thick laminate layer of LDPE also reduces openability.

Reducing the LDPE laminate layer thickness on the other hand, was not desired, because then different integrity problems were arising, while the openability was improved a little. Such different integrity problems may e.g. arise because fibres from the surface of the paperboard bulk layer penetrate the polymer of the laminate layer portion. Thus defects in an around the sensitive barrier layer portion may be created, such as in the worst case, small holes in the barrier material, but more frequently bad adhesion between the laminate layer polymer and the barrier layer portion. In the case of an aluminium foil barrier, it is important that the surface of the adjacent layers is even and smooth for best possible wettability and chemical bonding.

The mLLDPE polymers have better mechanical properties, such as i.a. puncture resistance, which is of great value in the laminate layer portion. Still, an mLLDPE does not provide sufficiently good adhesion when laminated in direct contact with e.g. an aluminium-foil. For optimal adhesion, it has proven necessary to laminate the mLLDPE polymer layer e.g. to the aluminum foil by means of an interjacent LDPE layer, which may be extrusion laminated at a higher temperature, such as from 320 to 330° C., and which provides good adhesion by mechanical interlocking also towards the paper fibres of the paperboard surface. Thus, the supporting LDPE layers provide a best possible bonding to the paperboard and barrier layer portion, while they simultaneously provide good bonding to the center layer of mLLDPE. Together, the three layers of the laminate layer portion also provide sufficient heat energy for good bonding between all the layers of the laminate between the bulk layer and the barrier layer portion, and to reduce neck-in effects.

By realising an idea to add a part of the amount of mLLDPE, which was removed from the inside layer portion, to the laminate layer portion instead, it was possible to work towards a laminated material that had improved package performance (such as longer shelf life) and still a maintained or acceptable openability.

The material layers that matter to the openability of a package having prepared opening arrangements in the laminated material, are the polymer layers and the barrier layers. They are intact and fully covering the prepared opening arrangements such as perforations, straw holes and opening holes, which are pre-cut in the bulk layer before laminating it to the polymer and barrier layers. When these layers are laminated over such prepared holes or slits, they are brought to adhere to each other, as laminated membranes, of polymer layers and barrier layers, within the hole areas. At opening, it is the strength of such membranes or individual layers that influences the openability most. Also, good adhesion of the layers to each other, within the membrane, supports openability well.

There are difficulties in extrusion coating a single, pure, or substantially pure, mLLDPE layer, and even if the pure mLLDPE layer on the inside was co-extrusion coated together with other melt layers, it was not initially perceived to be possible, at normal production speed. A single layer of mLLDPE is not possible to extrusion coat or laminate, at all, at the speeds required, i.e. at above 300 m/min, such as above 400 m/min, such as above 500 m/min and preferably above 600 m/min. However, as the development work progressed, it was realized that when the mLLDPE layer became sufficiently thin in relation to coextruded polymer layers of LDPE, it became easier to provide a stable and even layer, without neck-in problems or floppy edges of the extruded melt curtain. Thus, by keeping the mLLDPE layer relatively thin, and supported by the adjacent molten, co-extruded LDPE layers, and by choosing the polymers such that they flow well in co-extrusion together, it has been found that it is not necessary to blend the mLLDPE polymers with LDPE at all. In the melt extrusion of a molten polymer film curtain for coating onto a moving substrate web, there are two phenomena that need to be handled and mitigated, to produce an even and intact coating layer of polymer. On the one hand, in the case of low melt strength, there may be neck-in of the edges of the molten curtain, i.e. the edges of the molten film will become narrower than the web substrate and the film is thicker along the film curtain edges. On the other hand, in the case of thin coating layers, there may be instability of the edges, such that the edges are flickering along with the speed movement of the film curtain, such that the film may easily break.

These are thus the difficulties in extrusion coating and lamination of mLLDPE polymers. When considering introducing a layer of mLLDPE layer in the laminate layer portion, further openability and manufacturing efficiency problems were expected. However, when realizing what was needed, a co-extrusion three-layer configuration of LDPE and mLLDPE was developed, that allowed the use of mLLDPE in the laminate layer portion, without having to slow down the lamination process, by keeping the mLLDPE layer relatively thin and by using support layers of LDPE on each side of the mLLDPE layer.

Accordingly, it was surprisingly seen, that a similar amount of mLLDPE in the material structure as a whole, however distributed differently between the polymer layer portions, could improve the package integrity and shelf life considerably, without impairing the openability of the package. Alternatively, it could improve the openability without impairing the package integrity and shelf life, or improve both opposing properties.

The material structure with the ranges of layer thicknesses as defined in the present invention, enables a good balance between package integrity and shelf life on the one hand, and openability properties on the other hand, over the whole range of package sizes and package formats. While small packages, such as portion packs of about 0.2-0.3 litres, use a rather thin paperboard as the bulk layer and carry a lighter weight of liquid, they work well at the lower end of the layer thickness ranges. One-litre family packages employing a stiffer and thicker paperboard, may also operate at the lower end of the ranges. There are, however, larger package formats and bigger sizes, such as up to two-litre packages, which require heavier, thicker board to be able to hold a heavier weight of filled liquid, and which are considerably stiffer to fold and form into cuboid packages. Such packages typically need thicker polymer layer thicknesses, and thus operate at the higher end of the layer thickness ranges. Also, when pre-cut opening arrangements are rather big, such as holes of a diameter bigger than 10 mm, such as bigger than 15 mm, it has been seen that relatively thick and steady polymer layers are needed, to provide a stable, but still easily openable membrane of the laminate polymer and barrier layers.

By keeping the above laminate layer structure, with the defined order of layers in the laminate layer portion and in the inside layer portion, it is still possible to reach an improved balance between openability and package integrity compared to what has been possible with the thicker prior art laminated layer structures.

The innermost layer and the center layer of the laminate layer portion consist, or substantially consist, of mLLDPE. The invention works to its fullest potential when there is only mLLDPE in the layers, but the gist of the invention may be worked to some extent also by blending the mLLDPE with a low amount of LDPE, such as up to 15 wt %, such as up to 10 wt % of LDPE. There may be different amounts of LDPE added in the layers, or the same blend may be used. By blending, it should be understood that the advantageous effects are diluted and the good properties obtained are less prominent, than by using pure polymers in the layers.

Also the intermediate layer of LDPE, on the inside of the barrier layer, may be blended with up to 15 wt % of mLLDPE, for the same reason, i.e. that the effects of the invention may be seen to some extent, but less than when pure LDPE is used.

The support layers of the laminate layer portion, must consist of LDPE only and should contain no mLLDPE, because they need to be extruded at a high temperature to adhere well to the bulk layer and the barrier layer. At melt processing above 300° C., mLLDPE polymers may degrade and are therefore unsuitable. The co-extruded support layers of LDPE, may have the same or different thicknesses, thus the laminate layer portion may have a symmetric or an asymmetric layer structure.

The composition of the outermost layer of a thermoplastic polymer, is not critical and is less important for package integrity purposes, as long as it has a reasonable thickness of at least 10 μm, for heat sealing and layer integrity and quality. It may comprise mLLDPE, and the limiting factor is the overall openability of the package. Thus, it does not seem expedient to add mLLDPE to the outer layer, because it is not needed, and it might influence the package openability negatively. However, if it is added and the openability is maintained, then a correspondingly low amount of mLLDPE would seem possible to blend with an LDPE polymer, still obtaining the benefits of the invention.

According to another embodiment, there may be a decorative pre-fabricated film laminated to the outside of the bulk layer, which is further coated with a thermoplastic liquid-tight and heat-sealable layer of a thermoplastic polymer. Such a decorative film may for example be a metallised film, onto which the printed décor pattern of the package is applied, by a printing operation. For preserving openability of the packaging materials provided with openable weakenings in the form of perforations or pre-cut and laminated holds in the paperboard, such pre-fabricated films are perforated or pre-cut together with the bulk layer, since pre-fabricated polymer films often are mechanically too strong and tough to be torn or cut open by the consumer of a package made from such a laminated material.

Further laminated between the bulk layer and the innermost heat sealable and liquid tight layer, there is thus a barrier layer portion comprising a barrier metal foil or a barrier-coated polymer film. A typical barrier metal foil is aluminium foil. Alternatively, a polymer film substrate having a barrier coating, such as a dispersion-coated or liquid-film coated barrier coating, or a vapour deposited barrier coating may be laminated there between. Such barrier foils and films have the common drawback that the actual barrier material is either a relatively brittle or stress-sensitive material with relatively low ability to stretch, or is applied at a very thin, and therefore sensitive, coating thickness, or both. Their sensitivity to mechanical stress may increase or decrease by barrier coating thickness. During the conversion of a laminated packaging material into a packaging container, there are several operations that will apply mechanical strain to the barrier material layers, such as the creasing of the material, the bending and folding of the material, as well as the sealing of it into folded and shaped packages.

Oxygen barrier properties may be provided by thin liquid film coatings, for example barrier polymers that are coated in the form of a dispersion or solution in a liquid medium or solvent, onto a substrate, such as a paper or polymer film substrate, and subsequently dried into thin barrier coatings. Such a liquid-film-coated film or foil may be incorporated in the packaging laminate on the inner side of the bulk layer, between the bulk layer and the innermost thermoplastic polymer layer, just like the aluminium foil is known to laminated on the inside of the paperboard. It is important that the dispersion or solution is homogeneous and stable, to result in an even coating with uniform barrier properties. Examples of suitable polymers for aqueous compositions with barrier properties are polyvinyl alcohols (PVOH), water-dispersible ethylene vinyl alcohols (EVOH) or polysaccharide-based water-dispersible or dissolvable polymers. Such dispersion coated or so called liquid film coated (LFC) layers may be made very thin, down to tenths of a gram per $m^2$, and may provide high quality, homogenous layers, provided that the dispersion or solution is homogeneous and stable, i.e. well prepared and mixed. PVOH has excellent oxygen barrier properties under dry conditions and also provides very good odour barrier properties, i.e. capability to prevent odour substances from entering the packaging container from the surrounding environment, e.g. in a fridge or a storage room, which capability becomes important at long-term storage of packages. Furthermore, such liquid film coated polymer layers from water-dispersible or -dissolvable polymers often provide good internal adhesion to adjacent layers, which contributes to good integrity of the final packaging container.

Suitably, the polymer is selected from the group consisting of vinyl alcohol-based polymers, such as PVOH or water dispersible EVOH, acrylic acid or methacrylic acid based polymers (PAA, PMAA), polysaccharides such as for example starch or starch derivatives, cellulose nanofibrils (CNF), nanocrystalline cellulose (NCC), chitosan, hemicellulose or other cellulose derivatives, water dispersible polyvinylidenechloride (PVDC) or water dispersible polyesters, or combinations of two or more thereof.

More preferably, the polymer binder is selected from the group consisting of PVOH, water dispersible EVOH, polysaccharides such as for example starch or starch derivatives, chitosan or other cellulose derivatives, or combinations of two or more thereof.

Such barrier polymers are thus suitably applied by means of a liquid film coating process, i.e. in the form of an aqueous or solvent-based dispersion or solution which, on application, is spread out to a thin, uniform layer on the substrate and thereafter dried.

The liquid composition may additionally comprise inorganic particles to further improve the oxygen gas barrier properties.

The polymer binder material may for example be mixed with an inorganic compound which is laminar in shape, or flake-formed. By the layered arrangement of the flake-shaped inorganic particles, an oxygen gas molecule has to migrate a longer way, via a tortuous path, through the oxygen barrier layer, than the normal straight path across a barrier layer.

The inorganic laminar compound may be a so-called nanoparticle compound dispersed to an exfoliated state, i.e. the lamellae of the layered inorganic compound are separated from each other by means of a liquid medium. Thus, the layered compound preferably may be swollen or cleaved by the polymer dispersion or solution, which at dispersion has penetrated the layered structure of the inorganic material. It may also be swollen by a solvent before added to the polymer solution or polymer dispersion or, exfoliated by physical methods such as ultrasound. Thus, the inorganic laminar compound is dispersed to a delaminated state in the liquid gas barrier composition and in the dried barrier layer. There are many chemically suitable nano-clay minerals, but preferred nano-particles are those of montmorillonite, such as purified montmorillonite or sodium-exchanged montmorillonite (Na-MMT). The nano-sized inorganic laminar compound or clay mineral preferably has an aspect ratio of 50-5000 and a particle size of up to about 5 μm in the exfoliated state.

Preferably, the barrier layer includes from about 1 to about 40 weight-%, more preferably from about 1 to about 30 weight % and most preferably from about 5 to about 20 weight %, of the inorganic laminar compound based on dry coating weight. Preferably, the barrier layer includes from about 99 to about 60 weight-%, more preferably from about 99 to about 70 weight % and most preferably from about 95 to about 80 weight % of the polymer based on the dry coating weight. An additive, such as a dispersion stabiliser or the like, may be included in the gas barrier composition, preferably in an amount of not more than about 1 weight % based on the dry coating. The total dry content of the composition is preferably from 5 to 15 weight-%, more preferably from 7 to 12 weight-%.

According to a different preferred embodiment, the inorganic particles mainly consist of laminar talcum particles having an aspect ratio of from 10 to 500. Preferably, the composition comprises an amount of from 10 to 50 weight-%, more preferably from 20 to 40 weight-% of the talcum particles, based on dry weight. Below 20 weight-%, there is no significant increase in gas barrier properties, while above 50 weight-%, the coated layer may be more brittle and breakable because there is less internal cohesion between the particles in the layer. The polymer binder seems to be in too low an amount to surround and disperse the particles and laminate them to each other within the layer. The total dry content of such a liquid barrier composition from PVOH and talcum particles may be between 5 and 25 weight-%.

Preferably, according to the invention, the oxygen gas barrier layer is applied at a total amount of from 0.1 to 5 $g/m^2$, preferably from 0.5 to 3.5 $g/m^2$, more preferably from 0.5 to 2 $g/m^2$, dry weight. Below 0.1 $g/m^2$, there will be no gas barrier properties achieved at all, while above 5 $g/m^2$, the coated layer will not bring cost-efficiency to the packaging laminate, due to high cost of barrier polymers in general and due to high energy cost for evaporating off the liquid. A recognisable level of oxygen barrier is achieved by PVOH at 0.5 g/m² and above, and a good balance between barrier properties and costs is achieved between 0.5 and 3.5 g/m².

According to a preferred embodiment of the invention, the oxygen gas barrier layer is applied in two consecutive steps with intermediate drying, as two part-layers. When applied as two part-layers, each layer is suitably applied in amounts from 0.1 to 2.5 g/m², preferably from 0.5 to 1 g/m², and allows a higher quality total layer from a lower amount of liquid gas barrier composition. More preferably, the two part-layers are applied at an amount of from 0.5 to 2 g/m² each, preferably from 0.5 to 1 g/m² each.

According to a different embodiment of the invention, barrier coatings may be applied by means of physical vapour deposition (PVD) or chemical vapour deposition (CVD) onto a substrate surface of a film material. The substrate material itself may contribute with some properties as well, but should above all have appropriate surface properties, suitable for receiving a vapour deposition coating, and should work efficiently in a vapour deposition process.

Thin vapour deposited layers are normally merely nanometer-thick, i.e. have a thickness in the order of magnitude of nanometers, for example of from 1 to 500 nm (50 to 5000 Å), preferably from 1 to 200 nm, more preferably from 1 to 100 nm and most preferably from 1 to 50 nm.

One common type of vapour deposition coating, often having some barrier properties, in particular water vapour barrier properties, is so called metallisation layers, e.g. aluminium metal physical vapour deposition (PVD) coatings.

Such a vapour deposited layer, substantially consisting of aluminium metal may have a thickness of from 5 to 50 nm, which corresponds to less than 1% of the aluminium metal material present in an aluminium foil of conventional thickness for packaging, i.e. 6.3 µm. Vapour deposition metal coatings require significantly less metal material, and normally provide a lower level of oxygen barrier properties.

Other examples of vapour deposition coatings are aluminium oxide (AlOx) and silicon oxide (SiOx) coatings. Generally, such coatings are more brittle and less suitable for incorporation into packaging materials by lamination.

Other coatings for laminated packaging materials may be applied by means of a plasma enhanced chemical vapour deposition method (PECVD), wherein a vapour of a compound is deposited onto the substrate under more or less oxidising circumstances. Silicon oxide coatings (SiOx) by PECVD coating may, for example, obtain very good barrier properties under certain coating conditions and gas recipes.

The vapour deposition coating may alternatively be an amorphous hydrogenated carbon barrier layer applied by a plasma enhanced chemical vapour deposition process, PECVD, a so-called diamond-like carbon (DLC). DLC defines a class of amorphous carbon material that displays some of the typical properties of diamond. Preferably, a hydrocarbon gas, such as e.g. acetylene or methane, is used as process gas in the plasma for producing the coating.

The innermost heat sealable, liquid-tight layer is thus a layer of an m-LLDPE, for good lamination and material strength properties, further contiguously laminated to an intermediate layer of LDPE, also taking part in heat sealing operations. The inside thermoplastic polymers layers of the inner layer portion may be applied by co-extrusion coating of the molten polymers. They may also be co-extrusion coated together with the molten adhesive polymer to desired thicknesses of the respective layers.

Adhesive polymers suitable for lamination the inside heat sealable layers to a barrier foil or film, are so-called adhesive thermoplastic polymers, such as modified polyolefins, which are mostly based on LDPE or LLDPE co-polymers or, graft co-polymers, with functional-group containing monomer units, such as carboxylic acid functional groups, e.g. (meth) acrylic acid monomers or maleic anhydride (MAH) monomers, such as ethylene acrylic acid copolymer (EAA) or ethylene methacrylic acid copolymer (EMAA)), ethyleneglycidyl(meth)acrylate copolymer (EG(M)A) or MAH-grafted polyethylene (MAH-g-PE). Another example of such modified polymers or adhesive polymers are so called ionomers or ionomer polymers. Preferably, the adhesive polymer is an ethylene acrylic acid copolymer (EAA) or an ethylene methacrylic acid copolymer (EMAA).

The barrier metal foil or a barrier-coated film or sheet is laminated to the bulk layer by melt co-extruding there between, and pressing together in a rotating roller nip, a melt-film of three layers being a center layer of mLLDPE supported on each side by an LDPE layer, the LDPE layers thus bonding to the paperboard and the barrier layer, respectively.

In order to optimize melt extrusion coating and laminating performance, the mLLDPE polymer may have a melt flow index from 10 to 25, such as preferably from 15 to 25 g/10 min at 190° C., 2.16 kg (ISO1133), while the LDPE polymer may have a melt flow index from 4 to 12 g/10 min at 190° C., 2.16 kg (ISO1133).

At co-extrusion coating or co-extrusion lamination of pure mLLDPE, a relatively high melt flow index is needed to avoid the creation of too much heat of friction, as pure mLLDPE gains too high viscosity at high extrusion speed.

The mLLDPE polymer may have a density from 907 to 918, such as from 907 to 915 kg/m³. The LDPE polymer may have a density from 916 to 920 kg/m³. Density of the polymers may be measured by ISO1872/1183.

The mLLDPE may have an Eta 0 value, from 400 to 2500 Pas, such as from 400 to 1200 Pas, while the LDPE may have an Eta 0 value from 2000 to 15000 Pas. The Eta 0 value is measured in accordance with TAPPI T702, and is a measure of the zero shear viscosity, which represents the property of melt viscosity of a thin molten extruded film, and its ability to "draw-down", i.e. the ability of the melt to be drawn into thin films without breaking. Thus, draw-down is favoured by a melt that is more viscous than elastic.

The mLLDPE may have a G' value, from 5 to 20 Pa, while the LDPE may have a G' value from 100 to 150 Pa. The G' value is measured in accordance with TAPPI T702, and is a measure of the storage modulus, which represents the melt elasticity of a thin molten extruded film, in turn representing the tendency to so-called "neck-in", i.e. reduction of the width of the molten film. Thus, if high neck-in of the film, its melt elasticity is low.

Both the zero shear viscosity and the storage modulus are rheological measurements made by an oscillatory method, thus exploring the viscoelastic behaviour of a polymer melt, as further described in TAPPI T702.

In a further embodiment, the mLLDPE may have at least one melting point, at from 95 to 105 such as at from 96 to 100° C., while the LDPE may have a melting point from 105 to 115° C., such as from 105 to 110° C.

If selecting an mLLDPE with a too low melting point to initiate the melting for the sealing operation, the polymer surface will exhibit a higher friction and/or tackiness (stickiness) in being handled in the filling machine and on reels and web handling. On the other hand, if the melting point to initiate melting for the sealing operation is too high, above 105° C., the sealing properties will not be as good and the sealing process not as robust.

Melting points may be measured according to ASTM D3418 by DSC, by first scraping or peeling off polymer from the individual layers by a microtome, such as a standard microtome from Leica, and then analyse the samples taken by standard DSC, taking the melting points at the second heating at 0.5-10° C./min. The innermost layer portion of the innermost layer of mLLDPE and the intermediate layer of LDPE may first be separated from the layer of adhesive, carboxyl-group containing, polymer by means of by adding some isopropanol at the interface and carefully pulling the innermost layer portion off from the laminate. Having thus separated off the innermost layer portion, to have free surfaces of each of the inside polymer layers, samples may be scraped off from each surface by the microtome and subsequently analysed.

The fact that the layers comprise or consist of mLLDPE and LDPE respectively, may at least be confirmed with standard NMR (Nuclear Magnetic Resonance) analysis. By NMR analysis, the chain branching of the polymers may be studied, thus detecting the longer chain branches of the LDPE, and the shorter branches of the mLLDPE. The adhesive polymer layer comprising carboxylic functionality may be determined by FTIR analysis, also a well-known tool to the skilled person in the art of polymer analysis.

A good and quick understanding of which polymers are present in the innermost and intermediate inside layers may however be obtained by the mere standard DSC analysis of the innermost and intermediate inside layers taken in a sample together, and study the melting peaks at the second heating run at 0.5-10° C./min. Since the samples measured on are small (only about 2 milligrams), a standard or slower cooling/heating rate of the DSC scan is needed in order to separate the different peaks sufficiently well from each other. A typical curve from such analysis exhibit two melting peaks, or at least "shoulders" on the curve, one for the mLLDPE at 95-105° C. and another one for LDPE at from 105-115° C. Since the melting points lie relatively close to each other, the melting point peak of mLLDPE shows normally more like a "shoulder" or slight bend on the curve, When comparing to a corresponding curve for the pure LDPE, the difference is very clear. From such a curve, the skilled person understands that there are two polymers, and from the context that they are most likely one of LDPE type and another of the m-LLDPE type. The further microtome-sampling and DSC analyses may be done to confirm and compare to calibration curves for known pure polymers. This is further explained in connection to FIG. 9 below. For the specific mLLDPE analysed in a blend with LDPE, each corresponding melt peak of the mLLDPE thus shows as a shoulder or added slope on either side of the melting peak curve for the LDPE.

A similar approach may be taken to analyse the components of the individual layers of the laminate portion.

When taking samples from an extrusion-coated polymer or blend, on a packaging material, or a package, it may be that the melting points and the melt curve are shifted from 0.5° C. to at most 2° C. higher values, than compared to the polymers from granules or pellets.

The fact that the LLDPE polymer is a metallocene-catalysed LLDPE, i.e. an m-LLDPE, may be confirmed by spectrography using polarised X-ray radiation, such as by using a Spectro XEPOS® EDPXRF equipment from Ametek, to detect presence of metallocene catalyst residues.

Finally, the thicknesses of the individual layers may be measured by well-established microtome and optical microscopy methods, known to the skilled person in the art.

In an embodiment, the mLLDPE polymer is an ethylene copolymer with an alpha-olefin chosen from butene, hexene or octene.

The same mLLDPE may be used in the innermost layer as in the center layer of the laminate layer portion. By such a choice, greater production efficiency and control of raw material logistics will be possible. Furthermore, the balancing of properties between the inner layer portion and the laminate layer portion becomes easier, when one and a same mLLDPE polymer is used in both portions of the laminate.

For even greater efficiency and predictability of laminate properties, the LDPE polymer of the inside is the same as the one used in the support layers of the laminate layer portion.

Furthermore, the thermoplastic polymer used in the outside layer may be the same LDPE as the one of the inside layer, such that production and planning efficiency is as great as possible, the only variations between different package specifications being that the packaging laminate has different thicknesses of the layers, the different polymer grades being reduced to a minimum number, and the order of the layers being the same.

According to an embodiment, in line with the state of the art liquid carton packaging materials of today, the barrier layer portion is an aluminium foil. The aluminium foil typically has a thickness of from 5 to 10 μm, such as from 5 to 9 μm. Such a thick foil of aluminium metal may provide nearly absolute barrier properties towards migrating substances, such as gases, such as oxygen gas and water vapour, aromas, odours and also provides light barrier properties. Good barrier properties are needed for long-term preservation of food products. Depending on type of food product, some barrier properties are more important than the others. Milk and dairy products are for example particularly sensitive to penetration of light into the package, and thus require aluminium foil or similar light blocking materials to enable a long shelf life.

In particular, when the barrier layer is an aluminium foil, there is needed an adhesive polymer for adhering the inside layer portion layers well to the inside of the barrier layer. Such an adhesive polymer should be based on a polyolefin polymer, i.e. being built from in the majority polyolefin monomer units, such as ethylene, have a melt flow index from 4 to 12 g/10 min at 190° C., 2.16 kg (ISO1133) and has a content of carboxylic functional groups from 3 to 10 weight-%, for optimal melt processing properties as well as adhesion properties. Preferably, the adhesive polymer, as described above, is an ethylene acrylic (or methacrylic) acid copolymer or graft copolymer, such as EAA or EMAA.

Generally, it has been concluded that the thickness ratio of the total thickness of the inside polymer layers, i.e. the sum of thicknesses of the inner layer portion and the adhesive polymer layer, to the thickness of the laminate layer portion should be greater than 1, for most packaging specifications.

In a preferred embodiment, for portion packages and family packages of volumes up to 1 litre, having small openings such as perforation openings or straw holes or similar, the center layer of the laminate layer portion has a thickness from 4 to 8 μm, and constitutes not more than 40% of the total laminate layer portion thickness, which has a total thickness of 25 μm or lower, and the thickness of the innermost layer is from 6 to 15 μm, and constitutes not more than 50% of the total thickness of the inside polymer layers, which is 40 μm or lower.

Preferably, for portion packages and family packages of volumes up to 1 litre, having small openings such as perforation openings or straw holes or similar, the ratio of the total thickness of the inside polymer layers to the thickness of the laminate layer portion is greater than 1.2, such as greater than 1.5, and for portion packages it is preferably greater than 1.6, such as greater than 2.0.

It has been seen in experiments, and further in large data simulation series, that the thinner the laminate layer portion having a center layer of mLLDPE is made, the better tightness and barrier of the aluminium foil was obtained around the folding creases of the packages, and it could be understood that the risk for strain cracks that may arise in the barrier foil at these locations was decreased. Further investigations showed that it was above all the size of the cracks that was reduced, rather than the number of cracks.

Another effect seen was that when the thin laminate layer portion was kept constant, and the thickness of the inside layer portion was increased, the barrier properties around the folding creases improved even further. Thus, it was possible to decrease the laminate layer thickness more than expected, and to further increase the inner layer portion instead, thus improving the heat sealing strength and robustness further, despite having removed some of the mLLDPE polymer therein. At the same time, the openability properties could be well balanced without problems, i.e. improved.

Thus, at least for the smaller package sizes and the perforation and straw opening type of packages, it was seen that a ratio of the total thickness of the inside polymer layers to the thickness of the laminate layer portion of at least 1.3, and in many cases above 1.5 or even above 2.0, resulted in very good package integrity, and oxygen gas barrier properties as well as openability properties of the packages made from the material.

This supports a theory that by including a thin layer of mLLDPE within the laminate layer portion, there will be lower plastic strain exercised on the aluminium foil during folding of the laminated material.

The bulk layer may be a paperboard having a surface weight from 50 to 450 g/m$^2$, such as from 100 to 400 g/m$^2$, such as from 100 to 350 g/m$^2$, such as from 100 to 250 g/m$^2$.

Normally, paperboards are chosen such that they have a bending stiffness from 0 to 475 mN, such as from 80 to 260 mN. The thickness of a single paperboard may correspondingly vary from 50-600 μm. According to the second aspect of the invention, the method for manufacturing of the liquid carton packaging laminate comprises a step of extrusion laminating a web of the bulk layer to a web of the barrier layer portion by means of melt co-extruding the center layer of mLLDPE together with at least one support layer of LDPE, between the webs, and press together while solidifying the molten polymer in a roller nip, and a further step of melt co-extrusion coating the innermost layer of mLLDPE together with at least the intermediate layer of LDPE onto a web surface comprising the barrier layer portion. The two principal lamination steps may be carried out in any order, depending on the set-up of the lamination production line.

It is advantageous that all the polymer layers of the laminate layer portion, are co-extruded together in one melt extrusion operation. By such a co-extrusion configuration, the two support layers of LDPE on each side of the thin center layer of mLLDPE may support the mLLDPE with their mass and heat contained within their polymer mass, such that the mLLDPE easier flows in the molten film curtain and adapts to the circumstances around heating in the extruder feed-block and die, as well as to the cooling in the press roller lamination nip.

Analogously and for the same reasons, it is advantageous to let all the inside polymer layers on the inside of the barrier layer portion be co-extruded together in one melt extrusion operation. This is the most economical and rational way of applying the inside polymer layers, also because it enables a high lamination speed at typically above 300 m/min, such as above 400 m/min, even above 500 m/min, such as 600 m/min and above.

According to the third aspect of the invention, a liquid-, semi-liquid or viscous-food packaging container comprising the laminated packaging material of the invention is provided. The packaging container can be made from the laminated packaging material entirely, by fold-forming a sheet- or web-shaped blank into a cuboid or other fold-shaped package or merely into a pouch package. Alternatively, it may be used as a packaging material sleeve, to be combined with plastic bottle tops or the like.

The packaging containers of the invention have an improved, or at least maintained, performance regarding package integrity and barrier properties, and are cost-efficient from several aspects, such as being lean in raw materials used, and the lamination and packaging laminate manufacturing efficiency, as well as packaging container production efficiency, being improved. By being able to optimize the polymer layer thicknesses, and the lamination process, and the consumption of polymer raw materials, it is consequently possible to reduce the overall carbon footprint of the laminated packaging material product as well as the resulting packages made from it, altogether.

The thermoplastic polymer of the innermost heat sealable layer consists substantially of a metallocene-catalysed linear low density polyethylene (m-LLDPE). It may comprise a minor amount of low density polyethylene (LDPE), such as up to 15, such as 10 wt-%, while still maintaining the advantages of the invention.

EXAMPLES AND DESCRIPTION OF DRAWINGS

Figure 2A:
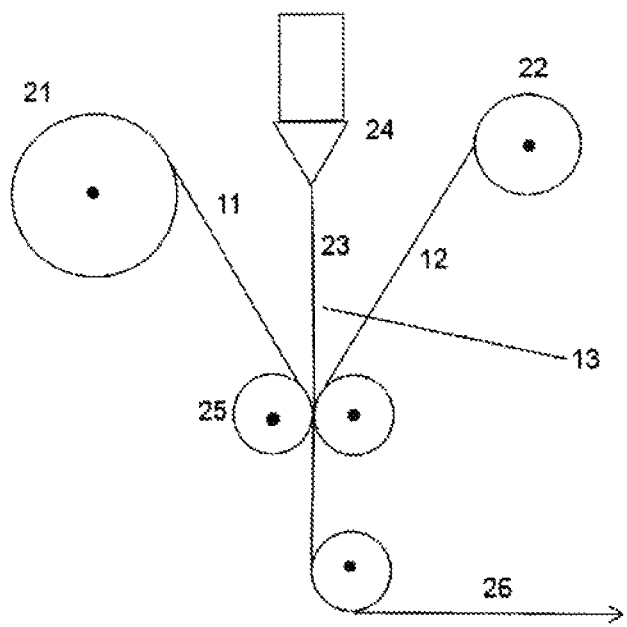
Figure 2B:
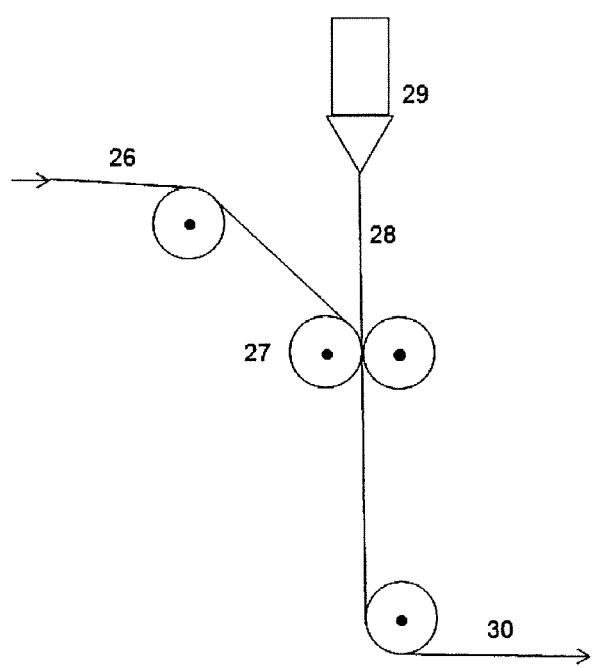
Figure 3A:
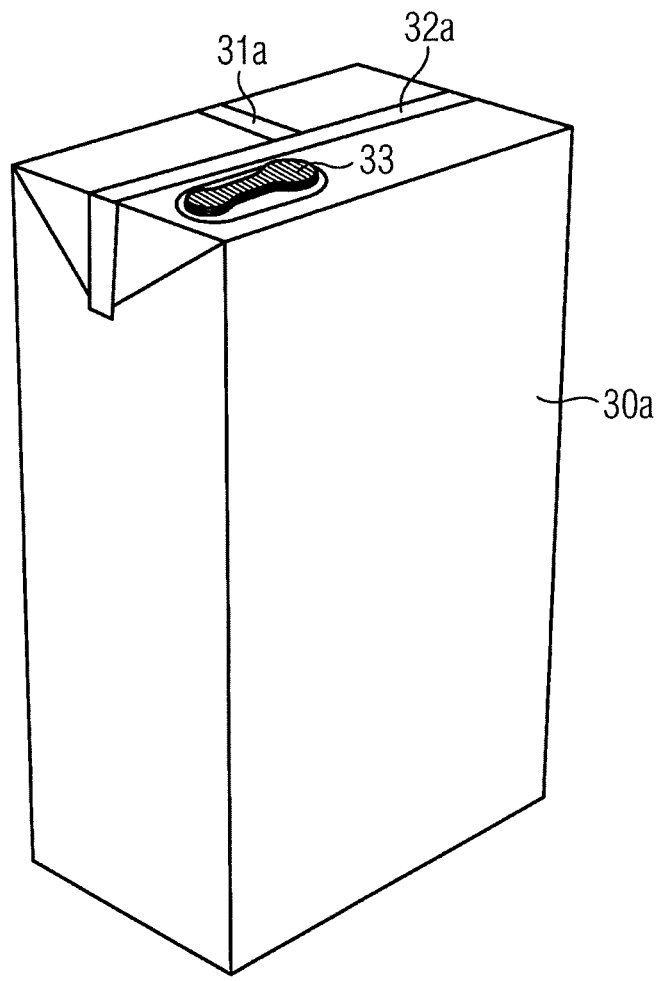
Figure 3B:
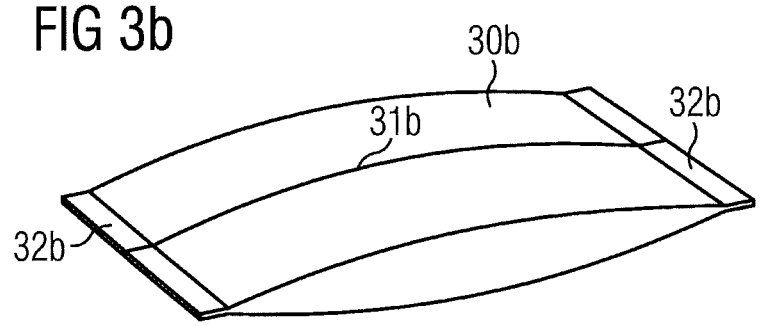
Figure 3C:
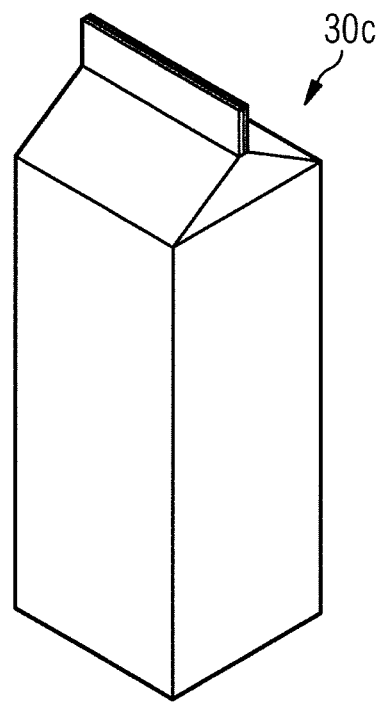
Figure 3D:
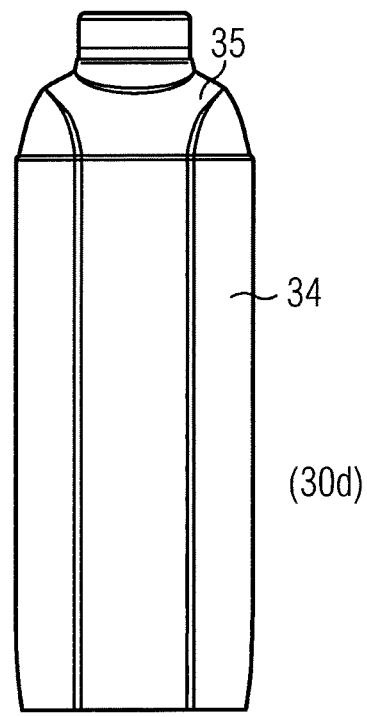
Figure 4:
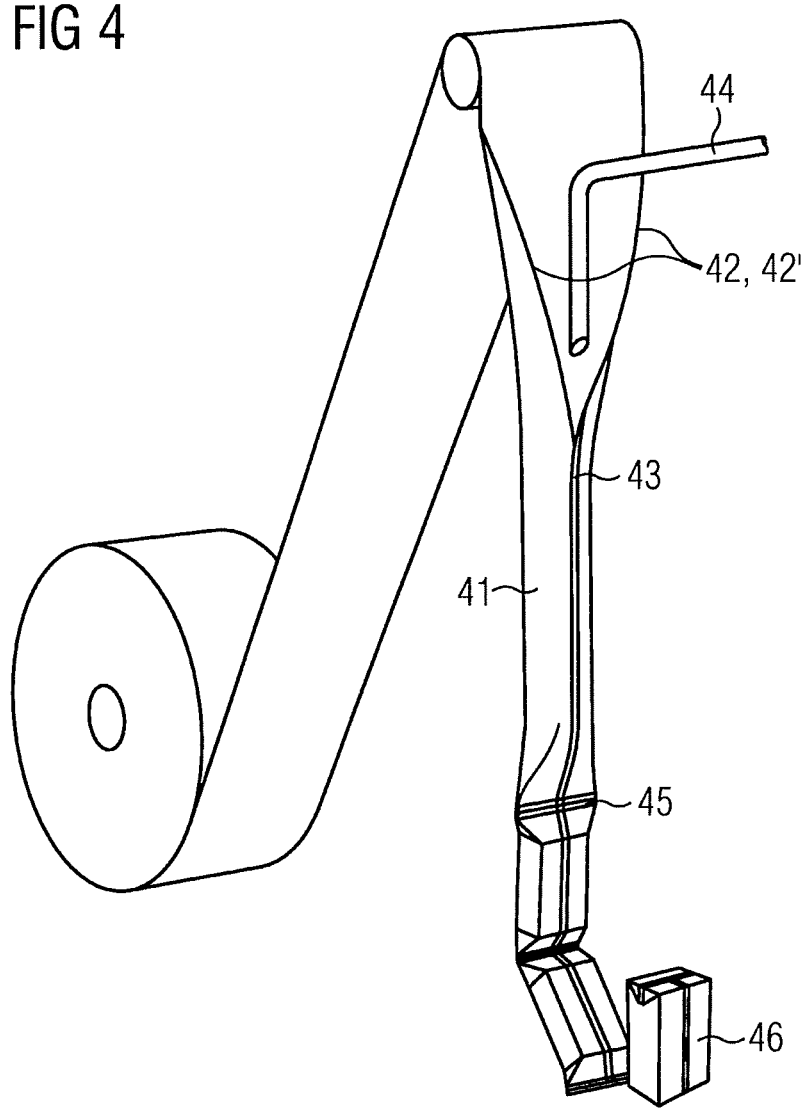
Figure 5:
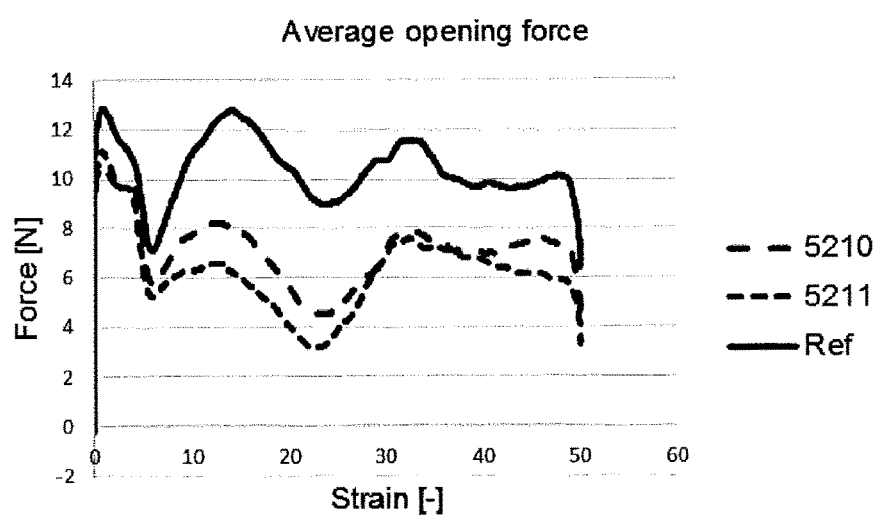
Figure 6A:
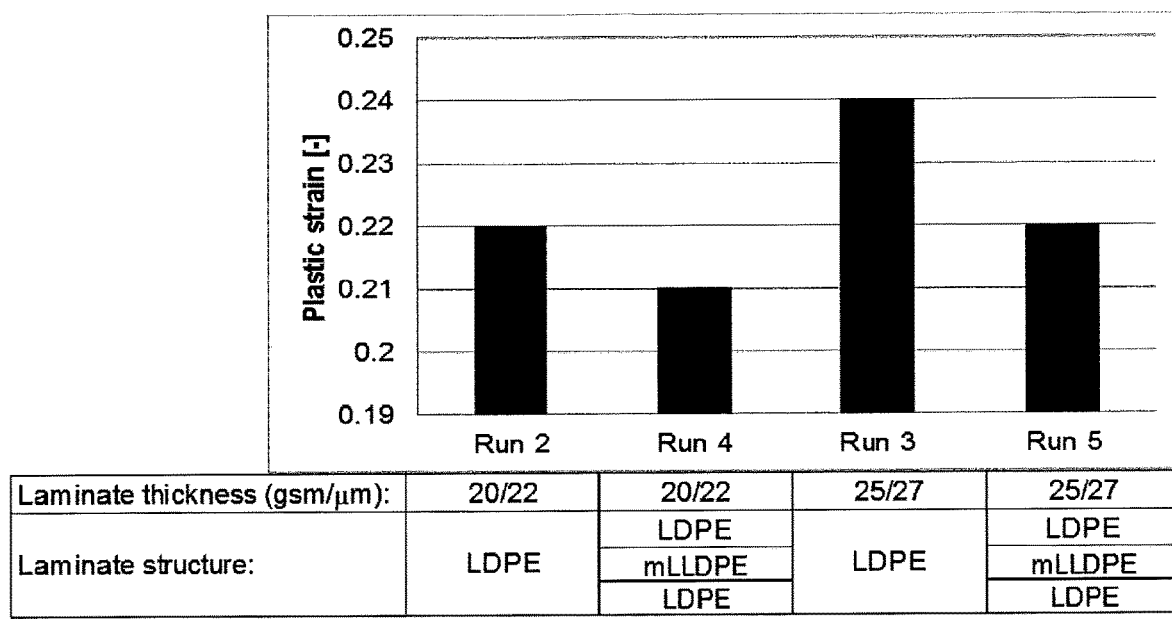
Figure 6B:
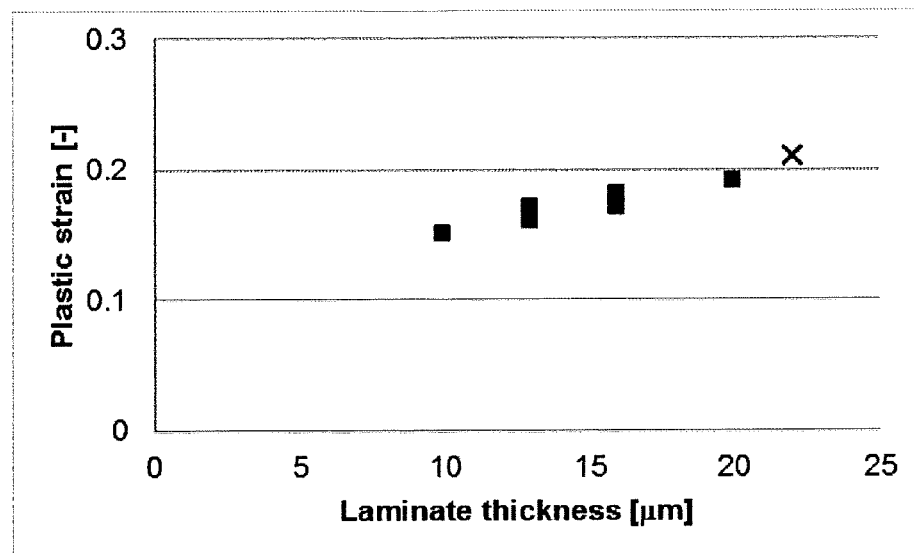
Figure 6C:
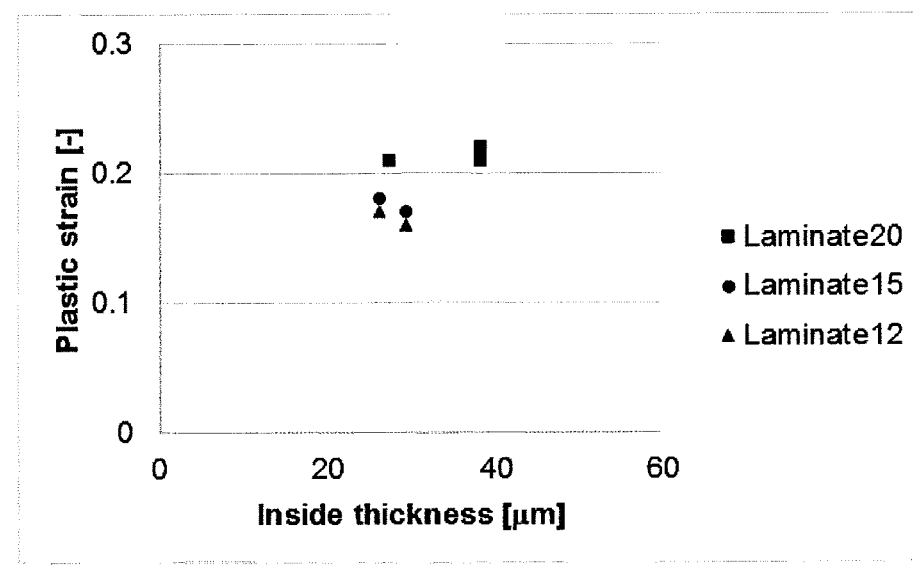
Figure 7A:
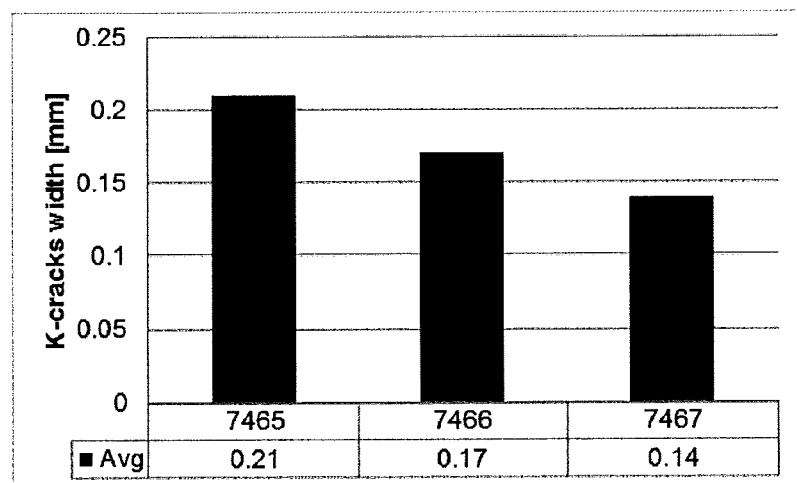
Figure 7B:
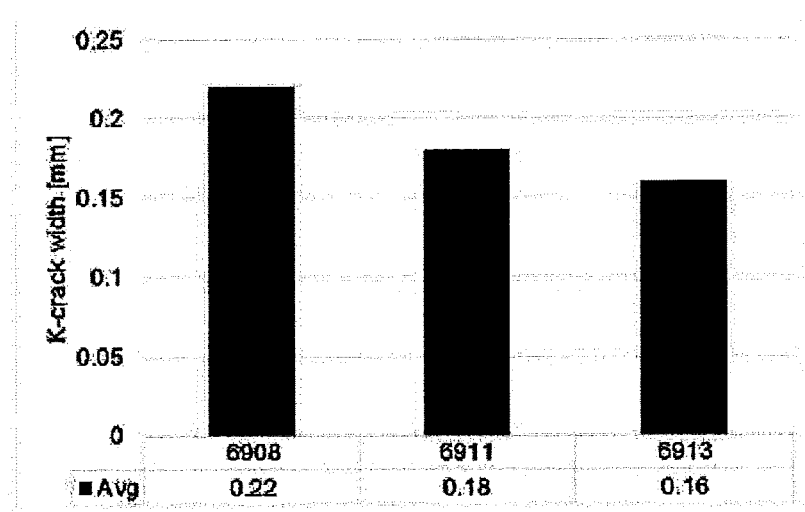
Figures 8, 9:
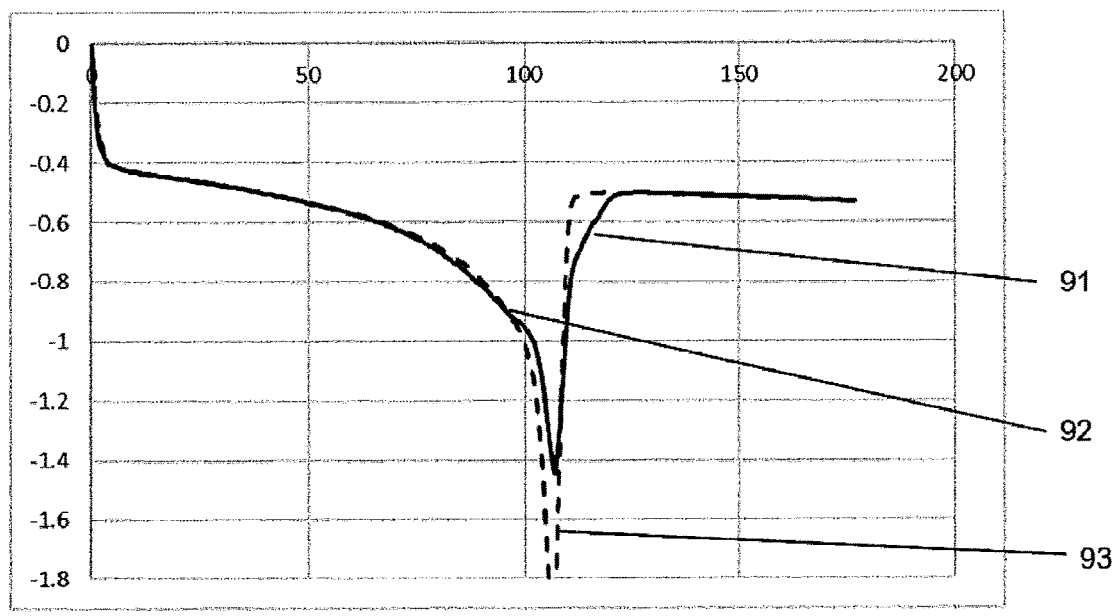

In the following, embodiments of the invention will be described with reference to the drawings, of which:

FIG. 1 is showing a schematic, cross-sectional view of a laminated packaging material according to the invention, FIG. 2a shows schematically a preferred example of a method, for laminating an aluminium foil barrier to a bulk layer in accordance with the invention, FIG. 2b shows schematically a preferred example of a method, for laminating the inside layers including the inner layer portion of heat-sealable and liquid-tight thermoplastic polymers to the barrier layer portion, in accordance with the invention, FIG. 3a, 3b, 3c, 3d show typical examples of packaging containers produced from the laminated packaging material according to the invention, FIG. 4 shows the principle of how packaging containers may be manufactured from the packaging laminate in a continuous, roll-fed, form, fill and seal process, FIG. 5 is a diagram showing how the openability varies between three different material structures, of which one is according to the invention, FIG. 6a is a diagram which shows the general influence of a thinner laminate layer portion on the peak plastic strain in the aluminium foil, and a comparison between a layer structure according to the invention and a layer structure according to a corresponding prior art layer structure, FIG. 6b is a diagram showing the peak plastic strain in the aluminium foil as a function of total thickness of the laminate layer portion, FIG. 6c is a diagram showing the plastic strain in the aluminium foil as a function of total thickness of the inside polymer layers, FIGS. 7a and 7b further respectively shows a diagram wherein the crack defects measured in the K-fold zone are plotted for a material structure of the invention, in comparison to a reference material structure, FIG. 8 shows the results of a rig test of heat sealing of different material structures at different power settings, and FIG. 9 shows an example of a possible melt diagram from analysing the two layers of the innermost layer portion together, with DSC according to ASTMD3418.

In FIG. 1, there is thus shown, in cross-section, a first embodiment of a laminated packaging material, 10, of the invention. It comprises a bulk layer 11 of a paperboard, having a grammage of about 200 g/m$^2$ and a bending stiffness of 260 mN.

On the inside, of the paperboard layer 11, the laminated material comprises a barrier layer portion 12, in this case being an aluminium foil of 6.3 μm thickness.

The barrier layer 12 is laminated to the bulk layer 11 by a laminate layer portion 13, consisting of a center layer of mLLDPE 14, having adjacent support layers of LDPE, 15, 16, on both sides. The support layer 15 bonds the center layer 14 to the bulk layer 11, while the support layer 16 bonds the center layer 14 to the barrier layer portion 12.

An inner layer portion 17 of heat-sealable and liquid-tight thermoplastic polymer layers is applied on the inside of the barrier layer 12. The inner layer portion consists of an innermost layer of mLLDPE 18 and an intermediate layer of LDPE 19.

In the case of the barrier layer portion 12 being an aluminium foil, the inner layer portion 17 is bonded to the aluminium foil 12 with an interjacent layer of an adhesive polymer 20.

The outer side of the bulk layer of paperboard 11 is covered with an outside layer 21 comprising LDPE, for heat sealability and liquid tightness from the outside of a package made from the packaging laminate.

In this example, the same mLLDPE polymer is used in the innermost layer 18, as in the center layer 14 of the laminate layer portion 13. The mLLDPE used in this specific example is from Dow, i.e. Elite® 5860.

Furthermore, the same LDPE polymer is used in the intermediate layer 19 of the inner layer portion 17, as in the support layers 15, 16 of the laminate layer portion 13. The LDPE used was 19N730 from Ineos.

Moreover, the same LDPE was used in the outermost, outside layer 21.

In FIG. 2a it is schematically illustrated how a web of the paperboard bulk layer 11, as described in FIG. 1, is forwarded from a reel 21 and extrusion laminated to a web of the barrier layer 12 of aluminium foil, which is forwarded from a reel 22. A molten polymer curtain 23 of the laminate layer portion 13, of the center layer 14 and the support layer 15 and 16 on each side thereof, is extruded 24 into a lamination nip 25, between the bulk layer 11 and the barrier layer 12, to be pressed together and cooled to solidify the molten polymer, thus permanently adhering the bulk and the barrier layer portion to each other to produce a pre-laminate 26. The resulting pre-laminate is forwarded to the next operation of the lamination process, in this case as further described in connection with FIG. 2b.

In FIG. 2b it is schematically illustrated how the web of the pre-laminate 26 of the bulk and barrier layers produced in FIG. 2a is forwarded to a lamination roller nip 27. At the roller nip 27, a molten curtain 28 of the three inside polymer layers, i.e. the adhesive polymer layer 20 and the inner layer portion 17 of the innermost layer 18 and the intermediate layer 19, are co-extruded 29 down into the lamination roller nip 27, and being cooled to be coated as a multilayer film coating onto the opposite side of the barrier layer portion 12, i.e. on the inside of the aluminium foil, by pressing and solidifying the polymer layers 18, 19, 20 to the surface of the web of the aluminium foil. The resulting laminate 30 may be forwarded to further lamination of the outside layer of LDPE onto the outside of the bulk layer, or if already done, to a reeling station for further transport and storage of the packaging laminate on a reel.

FIG. 3a shows an embodiment of a packaging container 30a produced from the packaging laminate 10 according to the invention. The packaging container is particularly suitable for beverages, sauces, soups or the like. Typically, such a package has a volume from about 100 to 1000 ml. It may be of any configuration, but is preferably brick-shaped, having longitudinal and transversal seals 31a and 32a, respectively, and optionally an opening device 33. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still easy to handle and dimensionally stable when put on a shelf in the food store or on a table or the like.

FIG. 3b shows an alternative, preferred example of a packaging container 30b produced from an alternative packaging laminate according to the invention. The alternative packaging laminate is thinner by having a thinner cellulose bulk layer 11, and thus it is not dimensionally stable enough to form a cuboid, parallellepipedic or wedge-shaped packaging container, and is not fold formed after transversal sealing 32b. It will thus remain a pillow-shaped pouch-like container and be distributed and sold in this form.

FIG. 3c shows a gable top package 30c, which is fold-formed from a pre-cut sheet or blank, from the laminated packaging material comprising a bulk layer of paperboard and the durable barrier film of the invention. Also flat top packages may be formed from similar blanks of material.

FIG. 3d shows a bottle-like package 30d, which is a combination of a sleeve 34 formed from pre-cut blanks of the laminated packaging material of the invention, and a top 35, which is formed by injection moulding plastics in combination with an opening device such as a screw cork or the like. This type of packages are for example marketed under the trade names of Tetra Top® and Tetra Evero®. Those particular packages are formed by attaching the moulded top 35 with an opening device attached in a closed position, to a tubular sleeve 34 of the laminated packaging material, sterilizing the thus formed bottle-top capsule, filling it with the food product and finally fold-forming the bottom of the package and sealing it.

FIG. 4 shows the principle as described in the introduction of the present application, i.e. a web of packaging material is formed into a tube 41 by the longitudinal edges 42 of the web being united to one another in an overlap joint 43. The tube is filled 44 with the intended liquid food product and is divided into individual packages by repeated transversal seals 45 of the tube at a pre-determined distance from one another below the level of the filled contents in the tube. The packages 46 are separated by incisions in the transversal seals and are given the desired geometric configuration by fold formation along prepared crease lines in the material.

The diagram in FIG. 5 shows the opening force required for the tearing open of a perforation opening of a 1-liter family package of the Tetra Brik® Slim type, made from a reference material structure and from a material structure according to the invention, as well as from a hybrid material structure.

The X-axis represents the strain as measured in the material, while the Y-axis measures the force required to open the same, along a standard perforation tearing line.

The three comparable laminate structures are as shown in Table 1.

The reference laminated packaging material has a state-of-the-art two-layer inside with a blend of mLLDPE and LDPE and a laminate layer of LDPE.

The laminated packaging material, No. 5210, has the same inside layer configuration as the reference, but a laminate layer portion as according to the invention.

The comparable laminated packaging material, No. 5211, is according to the invention.

support layers each have a thickness of 6.5 μm. The inside layer portion has two heat sealable layers, i.e. an innermost layer of mLLDPE at 6.6 μm (6 g/m$^2$), and an intermediate layer of LDPE, between the adhesive polymer layer and the innermost layer, at 13.0 μm (12 g/m$^2$). Thus, the innermost layer contains in this case no LDPE, and is a considerably thinner layer, but has an adjacent, intermediate, thicker layer of LDPE, instead.

The diagram of FIG. 5 thus shows that the reference sample material requires a higher initial force for opening of a perforation opening, and with a continued opening resistance clearly at a higher level than the other two samples. It can also be seen that the curves, representing the opening resistance from start of opening until the perforation is fully torn open, resemble each other, however at different levels of the force required and applied.

Furthermore, the material structure according to the invention, 5211, has the lowest opening force required of all three samples.

The sample 5210, which has the same inside layer configuration as the reference sample, but a different laminate layer portion, requires a lower opening force than the reference sample, probably due to that the laminate layer is considerably thinner at only 15.2 μm (14 g/m$^2$) in total, but

TABLE 1

| a)<br>Ref TBA/ml 1000 S | b)<br>5210 | c)<br>5211 |
|---|---|---|
| 12 g/m$^2$/13.0 μm LDPE | 12 g/m$^2$/13.0 μm LDPE | 12 g/m$^2$/13.0 μm LDPE |
| Board 260 mN | Board 260 mN | Board 260 mN |
| 20 g/m$^2$/21.7 μm LDPE | 5 g/m$^2$/5.4 μm LDPE | 6 g/m$^2$/6.5 μm LDPE |
|  | 4 g/m$^2$/4.4 μm mLLDPE | 6 g/m$^2$/6.6 μm mLLDPE |
|  | 5 g/m$^2$/5.4 μm LDPE | 6 g/m$^2$/6.5 μm LDPE |
| 6.3 μm Al-foil | 6.3 μm Al-foil | 6.3 μm Al-foil |
| 6 g/m$^2$/6.4 μm EAA | 6 g/m$^2$/6.4 μm EAA | 6 g/m$^2$/6.4 μm EAA |
| 19 g/m$^2$/20.9 μm mPE | 19 g/m$^2$/20.9 μm mPE | 12 g/m$^2$/13.0 μm LDPE |
| (70% 5860 + 30% 770 G) | (70% 5860 + 30% 770 G) | 6 g/m$^2$/6.6 μm mLLDPE |
|  |  | 100% 5860 |

In all the three comparable laminate structures the paperboard bulk layer 51 is the same, the aluminium foil barrier layer 52 is the same, and the outermost heat sealable layer of LDPE 53 is the same and has the same thickness, i.e. 13.0 μm (12 g/m$^2$). Also, all the three structures have a bonding layer of EAA 54 that binds the inner heat sealable layer(s) to the inside of the aluminium foil, at a thickness of 6.4 μm (6 g/m$^2$).

The reference sample material structure a) has the structure as shown in Table 1, i.e. it has one single laminate layer of 21.7 μm (20 g/m$^2$) of LDPE 55, and an innermost layer 56 of a blend of 70 wt % of mLLDPE (Dow Elite 5860) and 30 wt % of LDPE (770G), at a thickness of 20.9 μm (19 g/m$^2$).

A different comparison material structure b) numbered as 5210, has the same inside layers structure as the reference sample, but has a different laminate layer portion, which is as the laminate layer according to the invention, having a center layer of mLLDPE at 4.4 μm (4 g/m$^2$), and a support layer of LDPE on each side thereof, at 5.4 μm (5 g/m$^2$).

The laminate material structure according to the invention is numbered as 5211, and has a similar laminate layer portion as the structure b), but wherein the center and instead has an mLLDPE as a center layer, but at a low thickness of only 4.4 μm (4 g/m$^2$).

The material structure according to the invention thus lowered the required opening force further, by instead of a blend of mLLDPE and LDPE on the inside layer, having a thinner layer of only mLLDPE. This was a surprising and enlightening effect, considering that it has previously been thought necessary to blend an mLLDPE in order to not make it too strong to open and too hard to process, for liquid carton packaging laminates.

In addition to the measured opening force, an independent panel of test openers found the sample packages made from material structure 5211 more "robust" to open, i.e. meaning that there were less plastic residues created around the opening laminate edge, as a result of opening a package.

A similar test and similar findings were made regarding these three material structures, based on packages having a straw hole, to be penetrated by a straw, in order to be opened and accessed for drinking. The straw hole, to be opened, then comprised all the layers of the laminate except from the bulk layer, as described in the above.

In a test series of different layer thickness configurations of laminated material structures of the invention, the peak plastic strain in the aluminium foil during folding was estimated by simulation and visualised in the diagrams 6a, 6b and 6c, as a function of polymer layer thicknesses. The material layer structures were as described in Tables 2 and 3, wherein the LDPE used in the intermediate layer of the innermost layer portion and in the laminate layer portion, was Novex® 19N730 from Ineos. The mLLDPE used was Elite® 5860 from Dow. When the mLLDPE was blended in the innermost layer portion, it was blended with the LDPE 770G from Dow. Also in the outside layer, the LDPE used was Novex® 19N730 from Ineos.

The adhesive polymer used in all examples was Primacor® 3540 from Dow.

Plastic strain is the strain obtained in the plastic region above the yield point where the metal does not return to its original shape after removal of stress. Higher plastic strains mean higher risk of foil cracks. An estimation of the peak plastic strain is thus a measure of the risk for strain that is effecting crack initiation in the aluminium barrier foil at fold-forming of packages to occur. Foil crack initiations have been observed to be connected to a higher oxygen transmission (OTR) through the aluminium foil barrier and the laminated packaging material. A lower peak plastic strain in the barrier material may thus result in improved oxygen barrier properties of the laminated packaging material comprising the barrier material layer, when fold-formed into packages.

The diagram of FIG. 6a shows the peak plastic strain obtained in the aluminium foil, from test runs 2, 4, 3 and 5. The simulations were made based on a scenario of folding the laminated packaging materials producing the most single-folding strain in the aluminium foil, i.e. at folding the laminate such that the outside of the material is folded against itself (the aluminium foil being located on the inside of the thick bulk layer). The strain was tested at a folding angle of 100 degrees.

It can be seen that at higher thickness of the laminate layer portion, by comparing runs 2 and 3 and 4 and 5, respectively, there is higher peak plastic strain in the aluminium foil and thereby likely also higher oxygen transfer or permeation through the laminate.

Similarly, there is higher peak plastic strain in the aluminium foil from the prior art layer structure (run 2) than in a corresponding layer structure according to the invention (run 4), which has the same total thickness of polymer layers in the laminate layer portion, and on the inside of the aluminium foil, respectively. This is also the conclusion from comparing run 3 and run 5.

The diagram of FIG. 6b shows the peak plastic strain in the aluminium foil as a function of total thickness of the laminate layer portion, structured according to the invention, (Runs 8-13). It may be concluded from the diagram, that when lowering the total thickness of the laminate layer portion from 20 to 9 μm, also the peak plastic strain of the aluminium foil was decreased from 22 to 15%, (expressed as the ratio of the sample length after deformation divided by the sample length at start). The cross represents a reference sample (Run 7) having a single innermost layer of a blend of mLLDPE and LDPE, the total inside layers being 27.4 μm (25 g/m$^2$) thick, and a relatively thick laminate layer portion of LDPE of about 21.8 μm (20 g/m$^2$).

The diagram of FIG. 6c shows the plastic strain in the aluminium foil as a function of total thickness of the inside polymer layers. It may be concluded from this diagram, that when increasing the total thickness of the inside polymer layers the plastic strain in the aluminium foil was further decreased. The left square point represents a reference sample not according to the invention, which has a laminate thickness of 22 μm i.e. 20 g/m2. When increasing the inside layer thickness of the reference sample, the right upper square point was obtained, i.e. the plastic strain increased. However, when instead a laminate layer configuration according to the invention was used, the lower right point was obtained, i.e. the plastic strain remained unchanged. In further samples of the invention, having thinner laminate layer portions, the plastic strain instead decreased, with increasing inside layer thickness.

The 20 g/m2 laminate layer portion samples are taken from runs 2, 4, and 7 in the Table. The 15 samples are taken from runs 9 and 10, while the 12 samples are taken from runs 11 and 12 in the table.

The simulation test-runs resulting in the diagrams of FIGS. 6b and 6c are described further in Tables 2 and 3.

TABLE 2

| Run | Board type | Outside Grade | Lam. 1 Grade | Lam. 2 Grade | Lam. 3 Grade | Inside 1 Grade | Inside 2:1 Grade | Inside 2:2 Grade |
|---|---|---|---|---|---|---|---|---|
| 2 | CLC/C Duplex | LDPE | LDPE | LDPE | LDPE | EAA | LDPE | mPE blend |
| 3 | CLC/C Duplex | LDPE | LDPE | LDPE | LDPE | EAA | LDPE | mPE blend |
| 4 | CLC/C Duplex | LDPE | LDPE | mLLDPE | LDPE | EAA | LDPE | mLLDPE |
| 5 | CLC/C Duplex | LDPE | LDPE | mLLDPE | LDPE | EAA | LDPE | mLLDPE |
| 7 | CLC/C Duplex | LDPE | LDPE | LDPE | LDPE | EAA | — | mPE blend |
| 8 | CLC/C Duplex | LDPE | LDPE | mLLDPE | LDPE | EAA | LDPE | mLLDPE |
| 9 | CLC/C Duplex | LDPE | LDPE | mLLDPE | LDPE | EAA | LDPE | mLLDPE |
| 10 | CLC/C Duplex | LDPE | LDPE | mLLDPE | LDPE | EAA | LDPE | mLLDPE |
| 11 | CLC/C Duplex | LDPE | LDPE | mLLDPE | LDPE | EAA | LDPE | mLLDPE |
| 12 | CLC/C Duplex | LDPE | LDPE | mLLDPE | LDPE | EAA | LDPE | mLLDPE |
| 13 | CLC/C Duplex | LDPE | LDPE | mLLDPE | LDPE | EAA | LDPE | mLLDPE |

TABLE 3

Package material spec

| Run | Outside PE [g/m²/μm] | Board Stiffness [mN] | Laminate 1 [g/m²/μm] | Laminate 2 [g/m²/μm] | Laminate 3 [g/m²/μm] | Total Laminate [g/m²/μm] | Aluminium foil [μm] | Inside 1 [g/m²/μm] | Inside 2:1 [g/m²/μm] | Inside 2:2 [g/m²/μm] | Total inside [g/m²/μm] |
|---|---|---|---|---|---|---|---|---|---|---|---|
| 2 | 16/17.4 | 370 | 5/5.4 | 10/10.9 | 5/5.4 | 20/21.3 | 6.3 | 6/6.4 | 14/15.2 | 15/16.5 | 35/37.7 |
| 3 | 16/17.4 | 370 | 6.25/6.8 | 12.5/13.5 | 6.25/6.8 | 25/27.1 | 6.3 | 6/6.4 | 17/18.5 | 17/18.7 | 40/43.2 |
| 4 | 16/17.4 | 370 | 7/7.6 | 6/6.6 | 7/7.6 | 20/21.8 | 6.3 | 6/6.4 | 23/25.0 | 6/6.6 | 35/37.6 |
| 5 | 16/17.4 | 370 | 9/9.8 | 7/7.7 | 9/9.8 | 25/27.3 | 6.3 | 6/6.4 | 27/29.3 | 7/7.7 | 40/43.0 |
| 7 | 12/13.0 | 260 | 5/5.4 | 10/11.0 | 5/5.4 | 20/21.8 | 6.3 | 6/6.4 | — | 19/20.9 | 25/27.3 |
| 8 | 12/13.0 | 260 | 6/6.5 | 6/6.6 | 6/6.5 | 18/19.6 | 6.3 | 6/6.4 | 12/13.0 | 6/6.6 | 24/25.6 |
| 9 | 12/13.0 | 260 | 5/5.4 | 5/5.5 | 5/5.4 | 15/16.3 | 6.3 | 6/6.4 | 11/12.0 | 7/7.7 | 24/25.7 |
| 10 | 12/13.0 | 260 | 5/5.4 | 5/5.5 | 5/5.4 | 15/16.3 | 6.3 | 6/6.4 | 14/15.2 | 7/7.7 | 27/28.9 |
| 11 | 12/13.0 | 260 | 4/4.4 | 4/4.4 | 4/4.4 | 12/13.2 | 6.3 | 6/6.4 | 10/10.9 | 8/8.8 | 24/25.7 |
| 12 | 12/13.0 | 260 | 4/4.4 | 4/4.4 | 4/4.4 | 12/13.2 | 6.3 | 6/6.4 | 13/14.1 | 8/8.8 | 27/28.9 |
| 13 | 12/13.0 | 260 | 3/3.3 | 3/3.3 | 3/3.3 | 9/9.9 | 6.3 | 6/6.4 | 12/13.0 | 9/9.9 | 27/28.9 |

Thus, it is concluded from run 2-13 that thicker polymer layers in the laminate layer portion in general give higher peak plastic strain in the aluminium foil. It is indicated from runs 4-6 that a combination of a thinner laminate layer portion and a thicker total inside (i.e. thicker innermost layer portion) may give the lowest strain in the aluminium foil. It is also seen from runs 2-5 that the structure of the laminate layer portion according to the invention, i.e. including a center layer of mLLDPE at a certain proportional thickness, may give lower strain than the runs with LDPE.

Again, from test runs 7-13, it may be concluded that a thinner laminate layer portion and a thicker total inside layer according to the invention (thicker innermost layer portion) may provide lower strain in the aluminium foil and accordingly, improved gas barrier properties should be obtainable.

The diagram of FIG. 7a shows, the width of actual, detected cracks measured in the K-fold zone of an aluminium foil barrier in a laminated material structure of the invention, and in reference sample material structures, when fold-formed into cuboid packaging containers. A packaging material is exposed to a high strain in the K-fold zone, from fold-forming into a packaging container of a cuboid shape, such as a brick-shaped, parallelepipedic shape. The width of the formed cracks were measured and the values were plotted for the three sample laminate layer structures, which are equal, except from the features described below.

The general structure is /(12 g/m²) 13.0 μm LDPE/260 mN paperboard/(12 g/m²) about 13 μm laminate layers/Alfoil 6 μm/total 25 g/m² inside layers/
Reference Sample No. 7465:
A laminate layer of LDPE at (12 g/m²) 13.0 μm and an innermost layer portion of a blend heat sealable layer at (19 g/m²) 20.9 μm and an adhesive layer of (6 g/m²) 6.4 μm, the blend being 70 wt % mLLDPE and 30 wt % LDPE.
Reference Sample 7466:
A laminate layer of LDPE at (12 g/m²) 13.0 μm and a total inside sealing layer at (25 g/m²) 27.2 μm, however comprising a pure mLLDPE innermost layer. The inside layer structure is (6 g/m²) 6.4 μm adhesive polymer, (10 gm²) 10.9 μm LDPE intermediate layer, and (9 g/m²) 9.9 μm mLLDPE.
Sample According to the Invention 7467:
A laminate layer portion according to the invention, having a center layer of mLLDPE at (4 g/m²) 4.4 μm thickness and bonding and support layers of LDPE at (4 g/m²) 4.4 μm thickness each, on each side of the center layer, the total laminate layer portion being (12 g/m²) 13.2 μm thick, and a total inside sealing layer at (25 g/m²) 27.2 μm, comprising a pure mLLDPE innermost layer. The inside layer structure is (6 g/m²) 6.4 μm adhesive polymer, (10 g/m²) 10.9 μm LDPE and (9 g/m²) 9.9 μm mLLDPE.

The larger the initial width of a crack appearing in the K-fold zone of the barrier layer, the higher is the risk for later formation of larger cracks in the barrier material, due to handling and distribution of the packages, such that ruptures and defects in the adjacent layers may be formed, potentially even worse, causing leakage of packed product content or ingress of bacteria into the filled product of the package interior. A crack in the K-fold zone of the barrier material may lead to loss of shelf life due to an increased amount of oxygen migrating into the filled packaging container. Thus, it is important to keep the width of the initial K-fold zone cracks formed by fold-forming into cuboid packages as low as possible in order to avoid or reduce the risk for package integrity or performance problems, after stressful handling and distribution.

It is clearly shown, that a significant decrease of the width of the cracks formed in the aluminium foil barrier layer, in the K-fold zone, is obtained by sample 7467, i.e. the laminate layer structure of the invention. Such a laminate structure should thus also provide improved package performance, from the K-fold zone point-of-view.

FIG. 7b shows the same relationship and conclusion regarding larger packaging containers having a corresponding laminated material structure, however thicker and stronger to be suitable for larger amounts of liquid food products, such as from 1.5 to 2 litres.

The laminated packaging material samples were as described below, and were fold-formed into cuboid packages of a same parallel-epipedic shape ("Slim"), of 1.5 litre. The general structure is
/(16 g/m²) 17.4 μm LDPE outside/370 mN paperboard/(20 g/m²) LDPE (or/7/6/7/ g/m²)/Alfoil 6 μm/(14 g/m²) 15.2 μm LDPE/(15 g/m²) mLDPE+LDPE blend (70+30 wt %)/(or /6/23/6/ g/m²).
Reference Sample No. 6908:
A laminate layer of LDPE at (30 g/m²) 32.6 μm and an innermost layer portion of a blend heat sealable layer at (19 g/m²) 20.9 μm, an adhesive layer of (6 g/m²) 6.4 μm, and an intermediate layer of LDPE at (20 g/m²) 21.7 μm, i.e. a total inside layer thickness of 49.0 μm, the innermost layer blend being a blend of 70 wt % mLLDPE and 30 wt % LDPE.
Reference Sample 6909:
A laminate layer of LDPE at (20 g/m²) 21.7 μm and an innermost layer portion of a blend heat sealable layer at (15 g/m²) 16.5 μm, an adhesive layer of (6 g/m²) 6.4 μm and an intermediate layer of LDPE at (14 g/m²) 15.2 μm, i.e. a total inside layer thickness of (35 g/m²) 38.1 µm, the blend being 70 wt % mLLDPE and 30 wt % LDPE.

Sample According to the Invention 6913:

A laminate layer portion according to the invention, having a center layer of mLLDPE at (6 g/m²) 6.6 µm thickness and bonding and support layers of LDPE at (7 g/m²) 7.6 µm thickness each, on each side of the center layer, the total laminate layer portion being (20 g/m²) 21.8 µm thick, and a total inside sealing layer at (39 g/m²) µm, having a pure mLLDPE innermost layer. The inside layer structure is (6 g/m²) 6.4 µm adhesive polymer layer, (27 g/m2) 29.3 µm intermediate LDPE layer and (7 g/m²) 7.7 µm innermost layer mLLDPE.

Again, there was a significant decrease of the width of the cracks formed in the aluminium foil barrier layer, in the K-fold zone, obtained by sample 6913, i.e. the laminate layer structure of the invention. Such a laminate structure thus may have improved oxygen barrier properties and package integrity, from the K-fold zone point-of-view.

The structures of the invention as shown by examples 7467 in FIG. 7a and 6913 in FIG. 7b, also have an improved resistance to puncture or break in the laminate layer portion, caused by fibres and uneven surfaces of bulk and barrier layers.

FIG. 8 shows the results of a rig test of heat sealing at different power settings of different material structures. It can thus also be concluded that the heat sealing window is widened by the laminated material structure of the present invention, in comparison to a reference structure having a blended innermost layer of mLLDPE and LDPE. A wider heat sealing window is beneficial because the sealing operation can be initiated at a lower temperature, and allows more time for the polymer chains of the sealing polymer to disentangle and entangle again, across the interface of the two polymer surfaces to be sealed to each other.

Legend:
X: blocked seal
O: tight seal
Sample 6322: mLLDPE with melting point of 97° C. and density 907 kg/m³ as innermost sealing layer; Elite 5860 from Dow
Material structure from outside to inside (g/m²): //16 LDPE/ppr 260 mN/9 LDPE/10 mLLDPE/9 LDPE/Alfoil 6.3/6 EAA/18 LDPE/10 mLLDPE//
6424: mLLDPE/LDPE blend as innermost sealing layer; mLLDPE: Elite 5860 from Dow and LDPE: 770G from Ineos
Material structure from outside to inside (g/m²): //16 LDPE/ppr 260 mN/30 LDPE/Alfoil 6.3/6 EAA/17 LDPE/12 mLL-DPE//
6425: mLLDPE with melting point of 106° C. and density 918 kg/m³ as sealing layer; Exceed 0019XC from Exxon Mobil
Material structure from outside to inside (g/m²): //16 LDPE/ppr 260 mN/9 LDPE/10 mLLDPE/9 LDPE/Alfoil 6.3/6 EAA/18 LDPE/10 mLLDPE//.

FIG. 9 thus shows an example of a possible melt diagram from analysing the two layers of the innermost layer portion together (i.e. one layer of LDPE and one layer of mLLDPE), with DSC according to ASTMD3418 at the second heating at 10° C./min. The melting point peaks of the mLLDPE "shine through" the melting curve 93 of the LDPE, since they lie rather close and the melt energy areas overlap each other. Thus, there is one melting point of the mLLDPE layer, visible as a "shoulder" on the slope of the LDPE curve at 92 in FIG. 9, and there is another mLLDPE melting point at the weakened slope 91 of the LDPE curve at the end of the melting process. A scanning ramp rate of 10° C./min, sometimes a lower ramp rate, is needed in order to "separate" the melting point peaks, to be visible in the DSC curve in this way.

To conclude, the above embodiments and evaluations show that the invention as defined by the claims, makes it possible to produce liquid carton packages having both improved openability properties and improved package integrity properties, as well as improved gas barrier properties. The packaging material of the invention is suitable for high-speed lamination processes, as well as exhibiting increased robustness in high-speed filling and sealing processes. The invention also makes it possible to reduce the total amounts of polymer raw materials involved and thus provide a resource-efficient packaging material.

The invention is not limited by the embodiments shown and described above, but may be varied within the scope of the claims. As a general remark, the proportions between thicknesses of layers, distances between layers and the size of other features and their relative size in comparison with each other, should not be taken to be as shown in the figures, which are merely illustrating the order and type of layers in relation to each other and all other features to be understood as described in the text specification.

The invention claimed is:

1. Liquid carton packaging laminate having the following laminated layer portions,
    a. an outermost liquid-tight and heat sealable layer of a thermoplastic polymer, outermost meaning directed to the outside of a packaging container made from the packaging laminate,
    b. a bulk layer of carton or paperboard, the bulk layer including an outer side and an opposite inner side, the outermost liquid-tight and heat sealable layer being applied on the outer side of the bulk layer,
    c. a barrier layer portion that includes an inner side,
    d. a lamination layer portion, which binds the inner side of the bulk layer to the barrier layer portion,
    e. an innermost layer portion of liquid-tight and heat sealable polymer, applied on the inner side of the barrier layer portion so that the lamination layer portion and the innermost layer portion are on opposite sides of the barrier layer portion,
    f. optionally, a layer of an adhesive polymer, which binds the innermost layer portion to the barrier layer portion, and has a thickness from 4 to 9 µm,
    the innermost layer portion having an intermediate layer of low density polyethylene (LDPE) and an innermost layer, which constitutes the inside surface of a packaging container made from the packaging laminate, of a linear low density polyethylene produced with a metallocene or metallocene-type catalyst, (mLLDPE), the innermost layer portion and the adhesive layer constituting inside polymer layers,
    wherein
    the lamination layer portion has a center layer of an mLLDPE, and a support layer of LDPE on each side of the center layer, the support layers of LDPE binding the center layer to the bulk layer and to the barrier layer portion, on the respective sides of the center layer, and
    wherein
    the thickness of the center layer is from 4 to 15 µm and constitutes not more than 40% of the total thickness of the lamination layer portion, the total thickness of the lamination layer portion being lower than 50 µm and wherein the thickness of the innermost layer of mLLDPE is from 6 to 20 μm and constitutes not more than 50% of the total thickness of the inside polymer layers, the total thickness of the inside polymer layers being up to 50 μm and wherein the mLLDPE of the innermost layer has at least one melting point from 95 to 105° C. and wherein the LDPE of the intermediate layer has a melting point from 105 to 115° C.

2. Liquid carton packaging laminate as claimed in claim 1, wherein the mLLDPE polymer has a melt flow index from 10 to 25 g/10 min at 190° C., 2.16 kg (ISO1133), while the LDPE polymer has a melt flow index from 4 to 12 g/10 min at 190° C., 2.16 kg (ISO1133).

3. Liquid carton packaging laminate as claimed in claim 1, wherein the mLLDPE of the innermost layer is the same as the one used in the center layer of the laminate layer portion.

4. Liquid carton packaging laminate as claimed in claim 1, wherein the LDPE polymer of the intermediate layer of the innermost layer portion is the same as the one used in the support layers of the laminate layer portion.

5. Liquid carton packaging laminate as claimed in claim 1, wherein the outermost liquid-tight and heat sealable layer comprises an LDPE polymer which is the same as the LDPE polymer of the intermediate layer of the innermost layer portion.

6. Liquid carton packaging laminate as claimed in claim 1, wherein the barrier layer portion is an aluminium foil.

7. Liquid carton packaging laminate as claimed in claim 1, wherein the adhesive polymer has a melt flow index from 4 to 12 g/10 min at 190° C., 2.16 kg (ISO1133) and has a content of carboxylic functional groups from 3 to 10 weight-%.

8. Liquid carton packaging laminate as claimed in claim 1, wherein thickness ratio of the total thickness of the inside polymer layers to the thickness of the laminate layer portion is greater than 1.

9. Liquid carton packaging laminate as claimed in claim 1, wherein the bulk layer is a paperboard having a surface weight from to 50 to 450 g/m².

10. Liquid carton packaging laminate as claimed in claim 1, wherein the center layer of the laminate layer portion has a thickness from 4 to 8 μm, and constitutes not more than 40% thickness of the total laminate layer portion, which has a total thickness of 25 μm or lower, and the thickness of the innermost layer is from 6 to 15 μm, and constitutes not more than 50% of the total thickness of the inside polymer layers, which is 40 μm or lower.

11. Liquid carton packaging laminate as claimed in claim 10, wherein the thickness ratio of the total thickness of the inside polymer layers to the thickness of the laminate layer portion is greater than 1.3.

12. Liquid carton packaging laminate as claimed in claim 10, wherein the bulk layer is a paperboard having a surface weight from 100 to 400 g/m².

13. Method for manufacturing of a liquid carton packaging laminate as claimed in claim 1, comprising a step of extrusion laminating a web of the bulk layer to a web of the barrier layer portion by means of melt co-extruding the center layer of mLLDPE together with at least one support layer of LDPE, between the webs, and press together while solidifying the molten polymer in a roller nip, and a further step of melt co-extrusion coating the innermost layer of mLLDPE together with at least the intermediate layer of LDPE onto a web surface comprising the barrier layer portion.

14. Method for manufacturing of a liquid carton packaging laminate as claimed in claim 13, wherein all the polymer layers of the laminate layer portion, are co-extruded together in one melt extrusion operation.

15. Method for manufacturing of a liquid carton packaging laminate as claimed in claim 13, wherein all the inside polymer layers are co-extruded together in one melt extrusion operation.

16. A packaging container manufactured from the liquid carton packaging laminate as defined in claim 1.

17. Liquid carton packaging laminate as claimed in claim 1, wherein the mLLDPE polymer has a melt flow index from 15 to 25 g/10 min at 190° C., 2.16 kg (ISO1133), while the LDPE polymer has a melt flow index from 4 to 12 g/10 min at 190° C., 2.16 kg (ISO1133).

18. Liquid carton packaging laminate as claimed in claim 10, wherein the thickness ratio of the total thickness of the inside polymer layers to the thickness of the laminate layer portion is greater than 1.5.

19. Liquid carton packaging laminate as claimed in claim 10, wherein the bulk layer is a paperboard having a surface weight from 100 to 350 g/m².

* * * * *